United States Patent
Webb

(10) Patent No.: US 7,954,225 B2
(45) Date of Patent: Jun. 7, 2011

(54) LOCKING PIN FOR COUPLING COMPONENTS

(76) Inventor: Charles T. Webb, Aledo, TX (US)

( * ) Notice: Subject to any disclaimer, the term of this patent is extended or adjusted under 35 U.S.C. 154(b) by 715 days.

(21) Appl. No.: 11/711,328

(22) Filed: Feb. 27, 2007

(65) Prior Publication Data

US 2007/0228728 A1   Oct. 4, 2007

Related U.S. Application Data

(60) Provisional application No. 60/780,421, filed on Mar. 8, 2006.

(51) Int. Cl.
*B23P 11/00*   (2006.01)
(52) U.S. Cl. ............. 29/525.01; 29/282; 29/451; 285/2; 285/3; 285/330; 403/294; 403/355; 403/408.1
(58) Field of Classification Search ............... 29/525.01, 29/282, 450, 451; 285/91, 2, 3, 330, 331, 285/80, 922; 403/408.1, 294, 318, 1, 292, 403/319, 355, 356
See application file for complete search history.

(56) References Cited

U.S. PATENT DOCUMENTS

| | | | | |
|---|---|---|---|---|
| 1,823,971 A * | 9/1931 | Erlandson | | 403/6 |
| 4,131,288 A * | 12/1978 | Wilson | | 280/11.17 |
| 4,331,012 A * | 5/1982 | Swisher | | 70/164 |
| 4,348,956 A | 9/1982 | Schmidlin | | |
| 4,363,505 A | 12/1982 | Smith | | |
| 4,407,146 A * | 10/1983 | Nielsen, Jr. | | 70/232 |
| 4,508,184 A * | 4/1985 | Hansen | | 175/346 |
| 5,367,945 A * | 11/1994 | Halka et al. | | 92/187 |
| 5,741,083 A * | 4/1998 | Schvartz | | 403/297 |
| 5,957,226 A * | 9/1999 | Holte | | 175/320 |
| 6,148,935 A | 11/2000 | Wentworth et al. | | |
| 6,352,288 B1 | 3/2002 | Calkins | | |
| 6,918,618 B2 | 7/2005 | Allouche | | |
| 7,121,363 B2 * | 10/2006 | Michael et al. | | 175/45 |
| 7,144,183 B2 * | 12/2006 | Lian et al. | | 403/319 |
| 7,147,065 B2 * | 12/2006 | Tjader | | 175/57 |
| 7,172,035 B2 * | 2/2007 | Michael et al. | | 175/19 |
| 7,354,537 B2 * | 4/2008 | Wanstrath | | 264/36.21 |
| 2004/0226750 A1 | 11/2004 | Tjader | | |
| 2008/0298889 A1* | 12/2008 | Theriault | | 403/408.1 |

* cited by examiner

*Primary Examiner* — David P Bryant
*Assistant Examiner* — Christopher M Koehler
(74) *Attorney, Agent, or Firm* — Geoffrey A. Mantooth

(57) ABSTRACT

First and second components can be releasably coupled together with a locking pin having a sacrificial o-ring. The first and second components have respective first and second openings that are aligned with each other and receive the locking pin. The second opening has a square edge located adjacent to a recess in the first opening. The o-ring has an outside diameter greater than the diameter of the square edge and an inside diameter less than the diameter of the square edge when assembled. The locking pin is inside of the first and second openings, with the o-ring inside of the recess. To release the components, the locking pin is moved out of the first opening to shear the o-ring against the square edge.

13 Claims, 23 Drawing Sheets

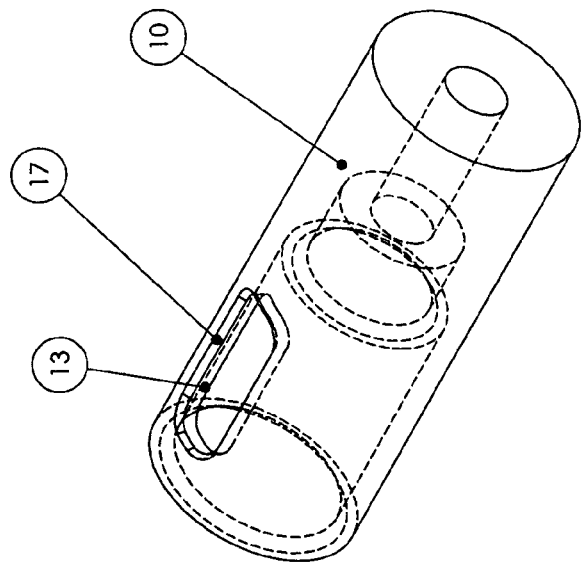
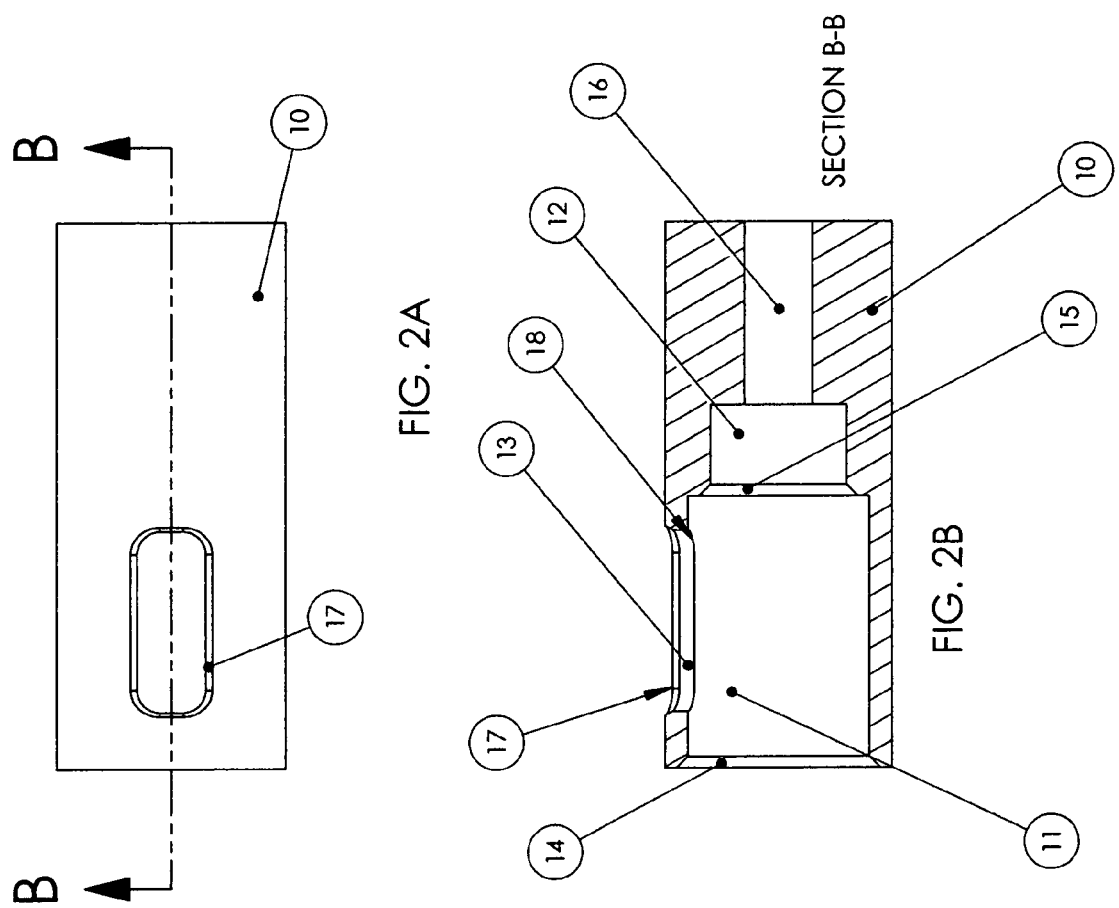

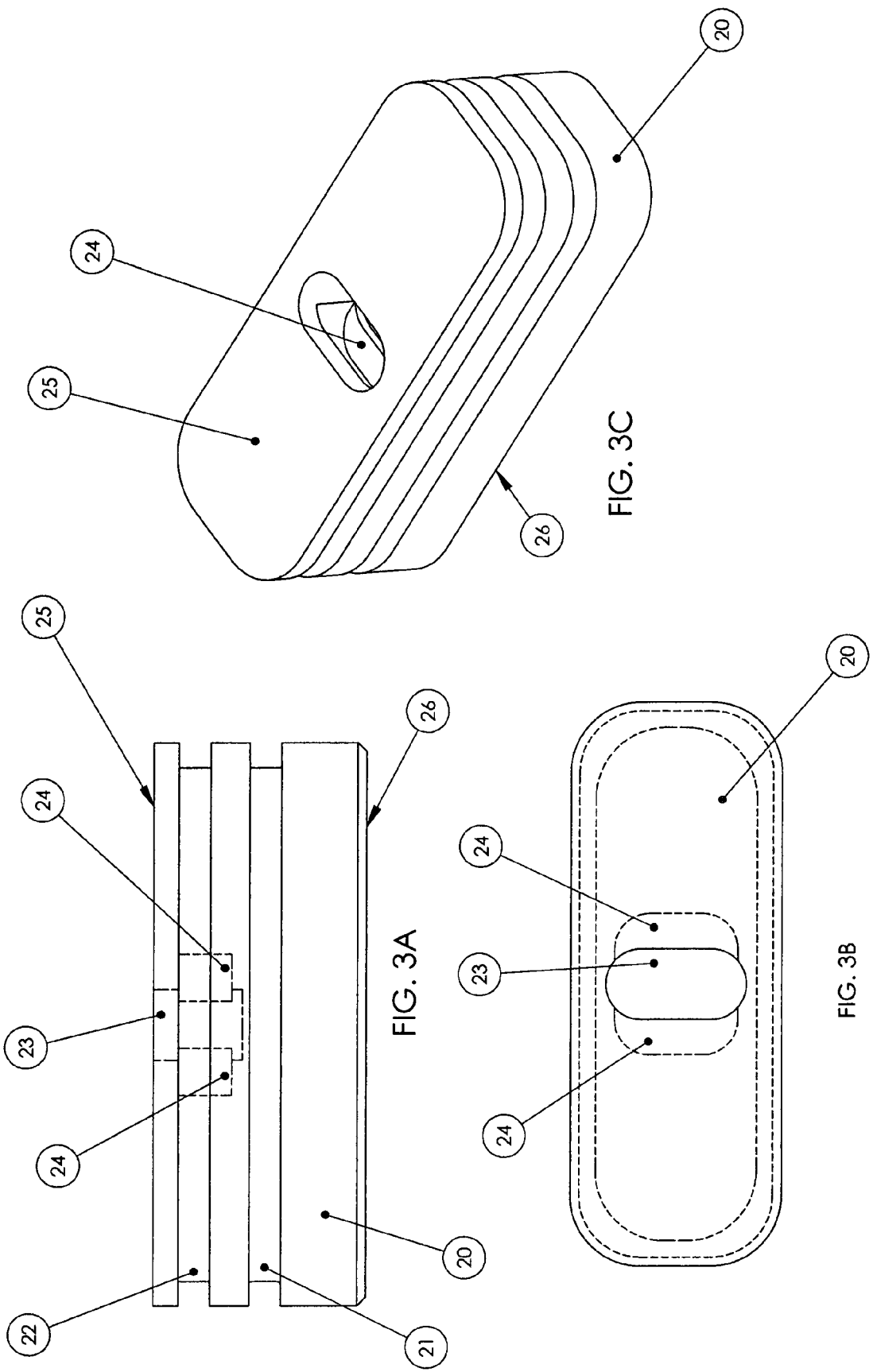

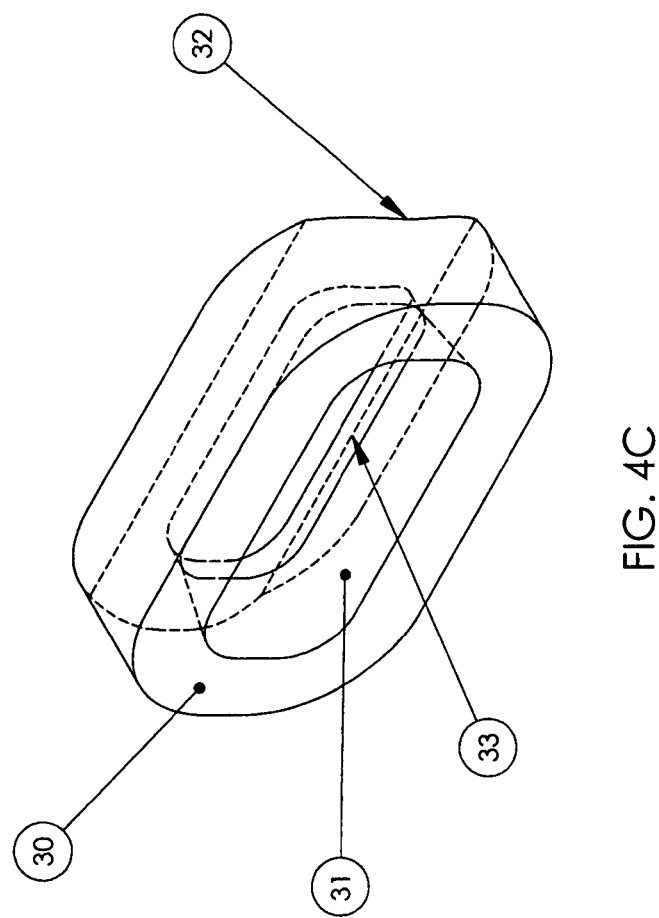
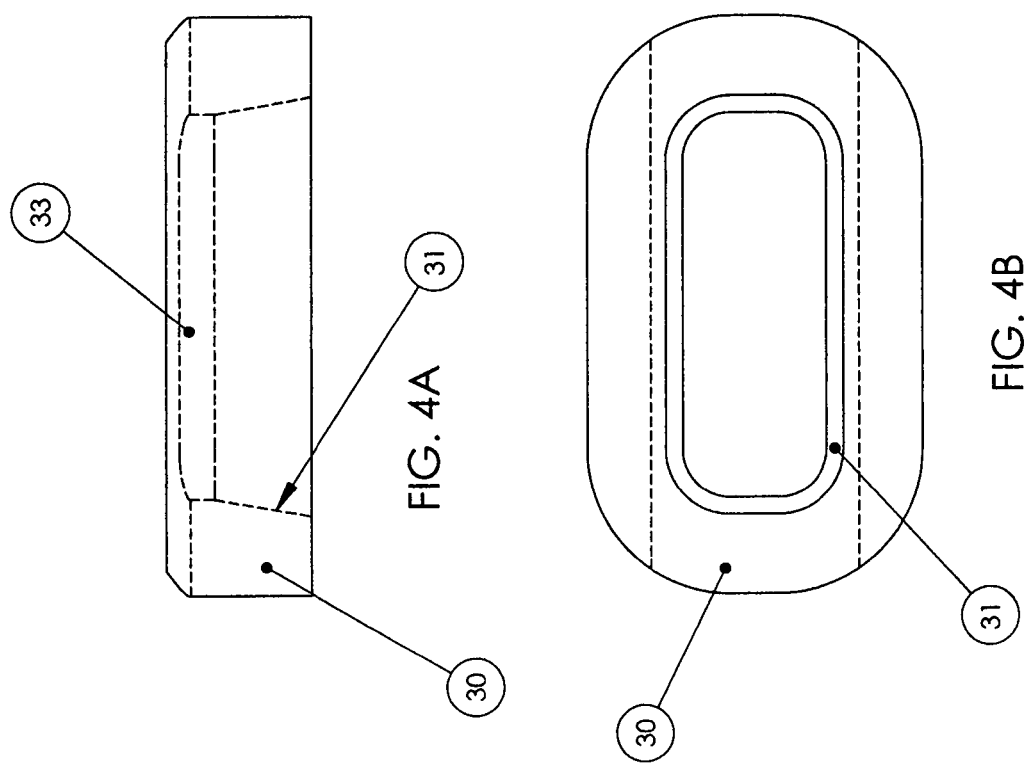

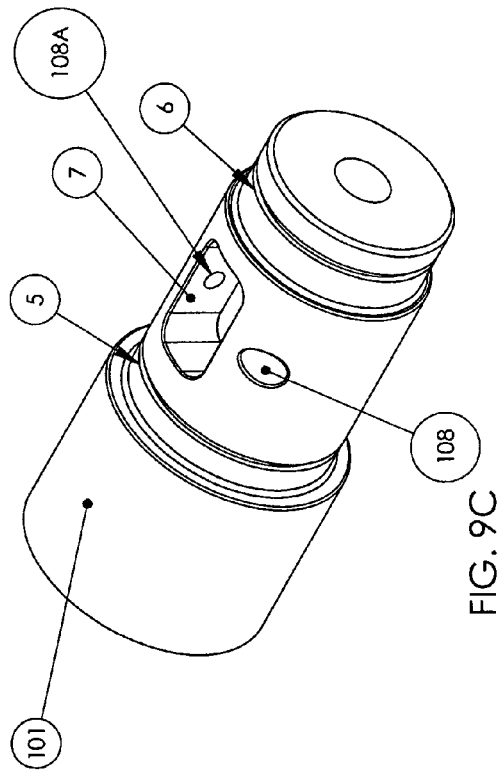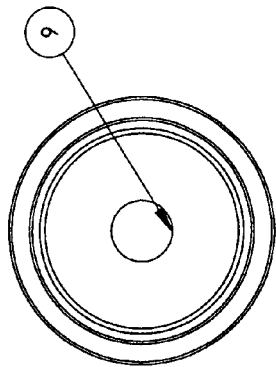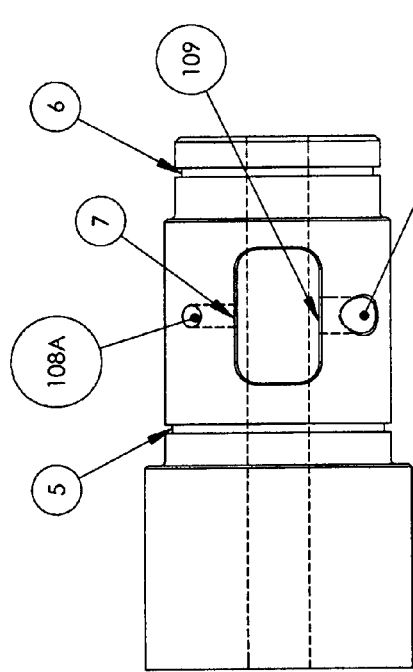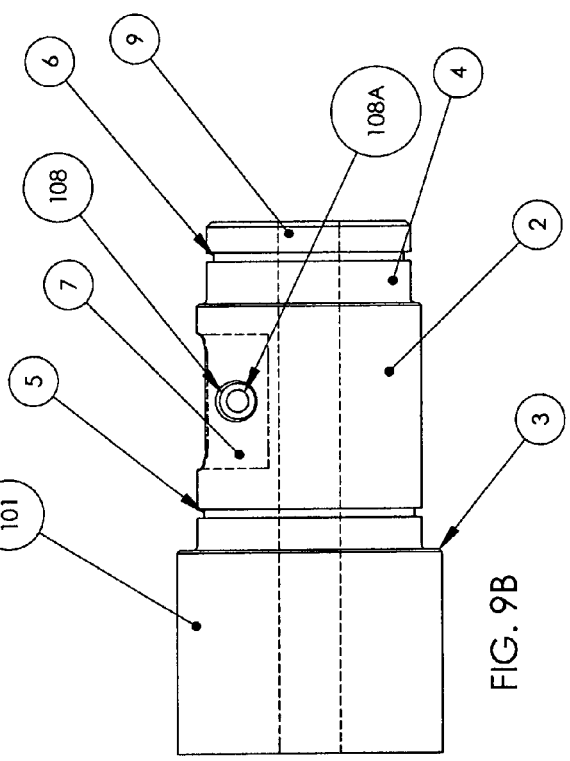

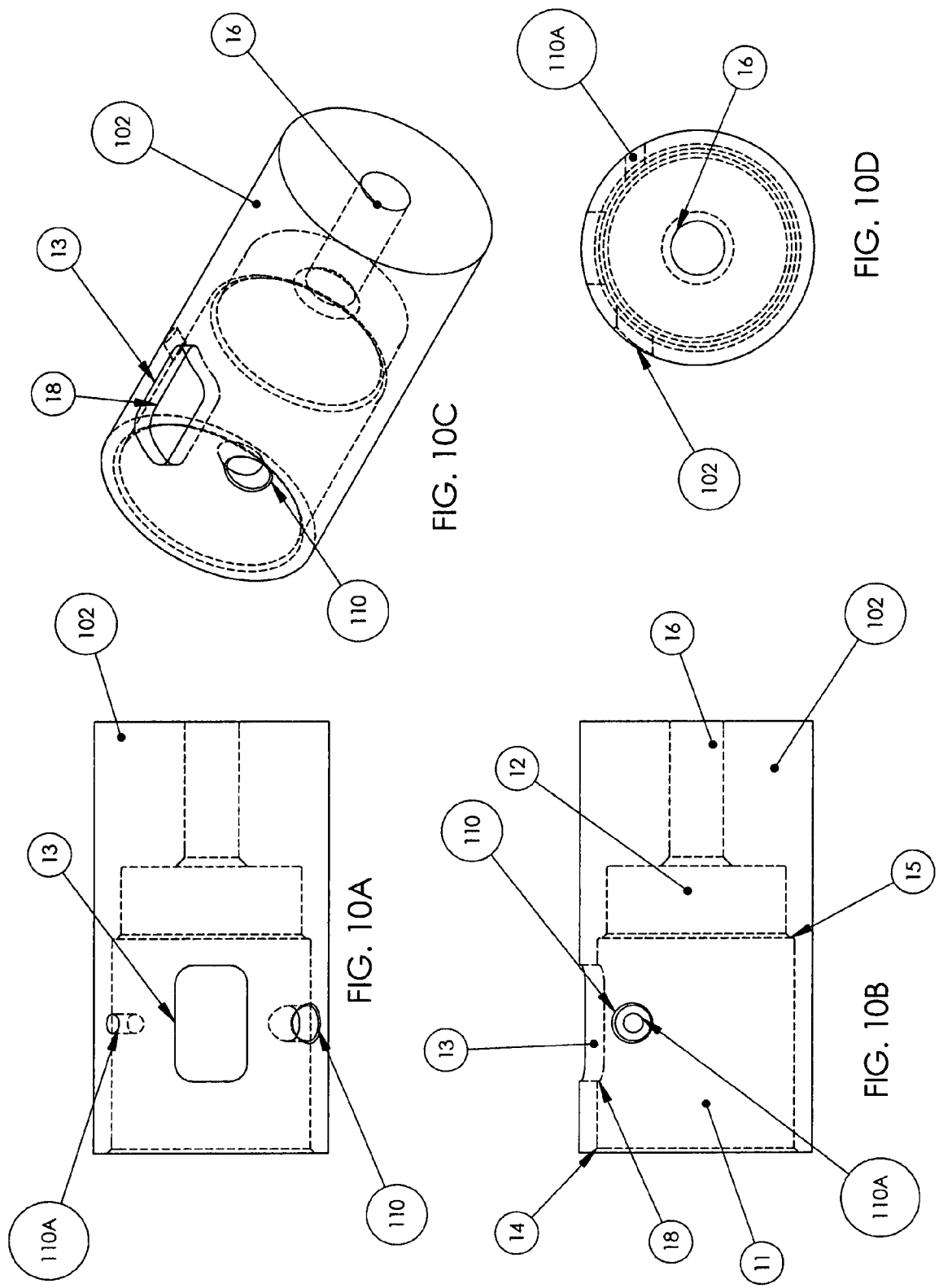

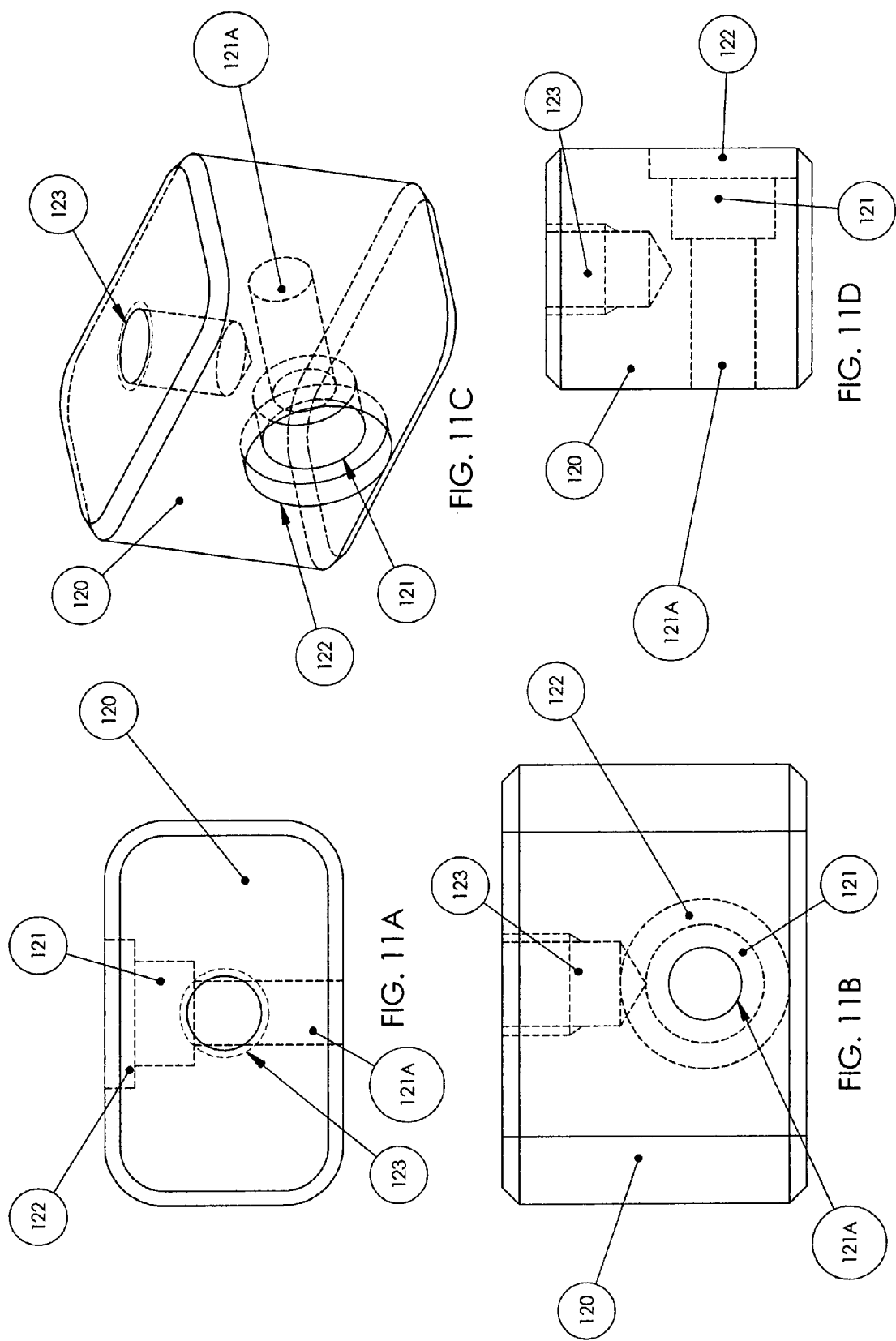

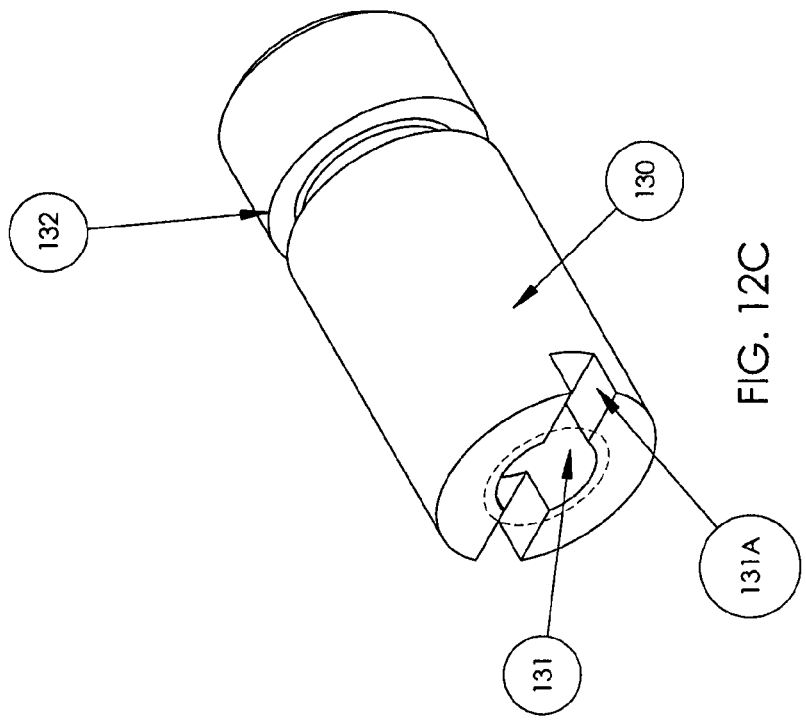
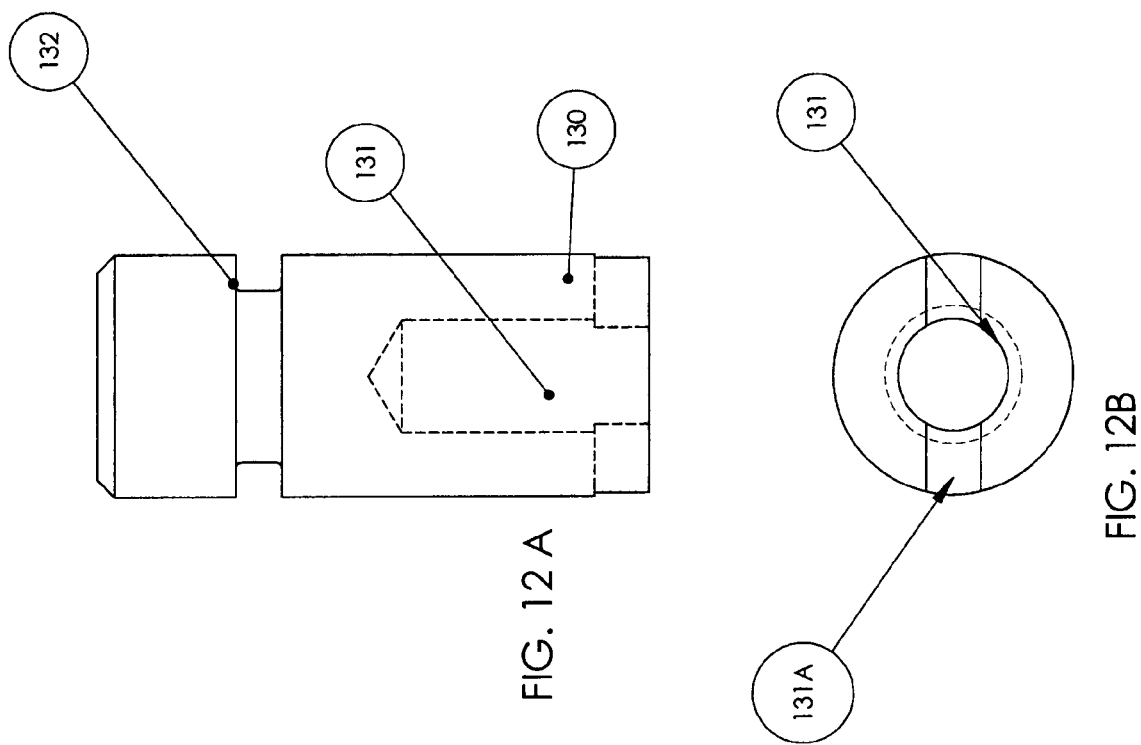
FIG. 12C
FIG. 12 A
FIG. 12B

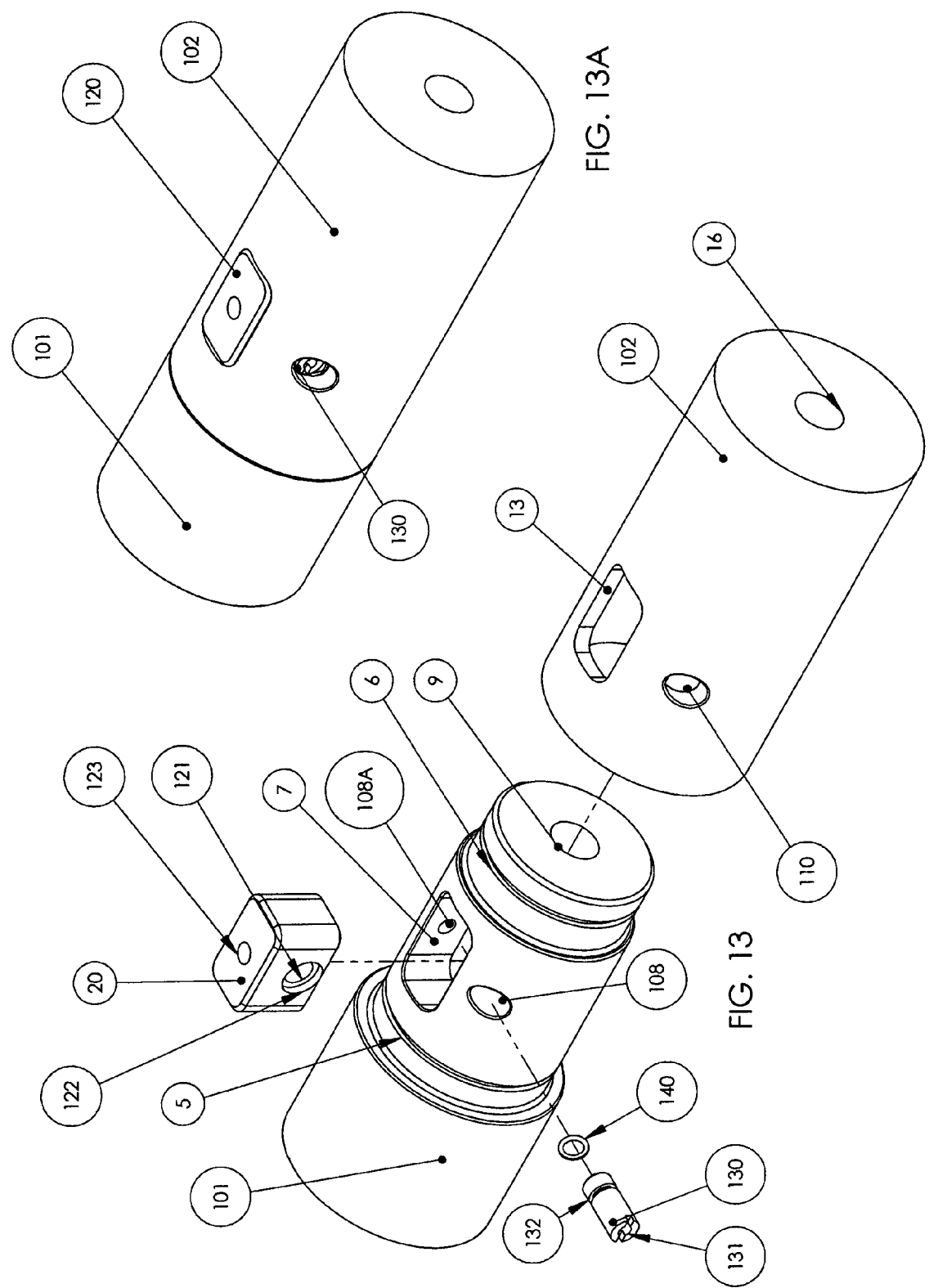

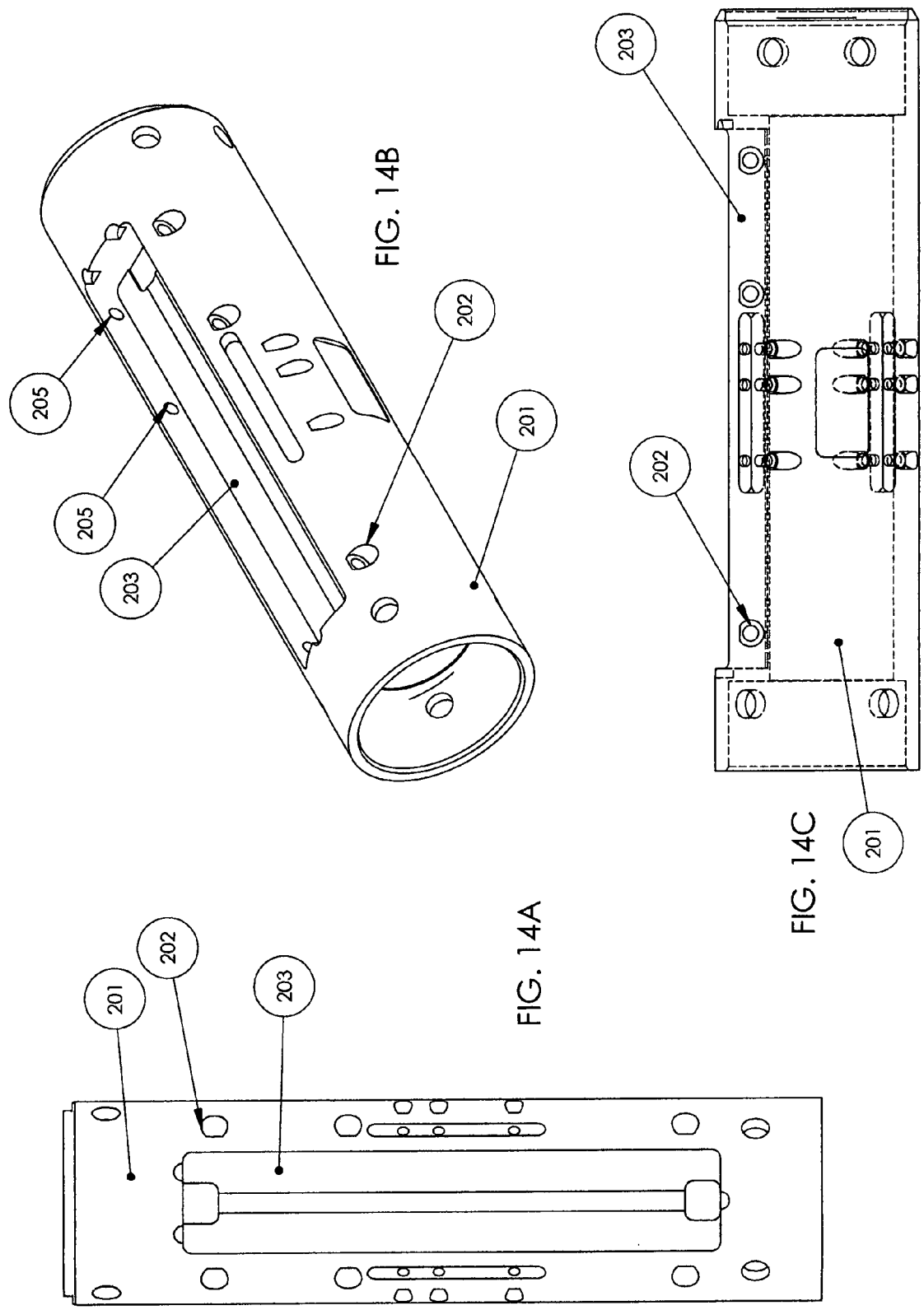

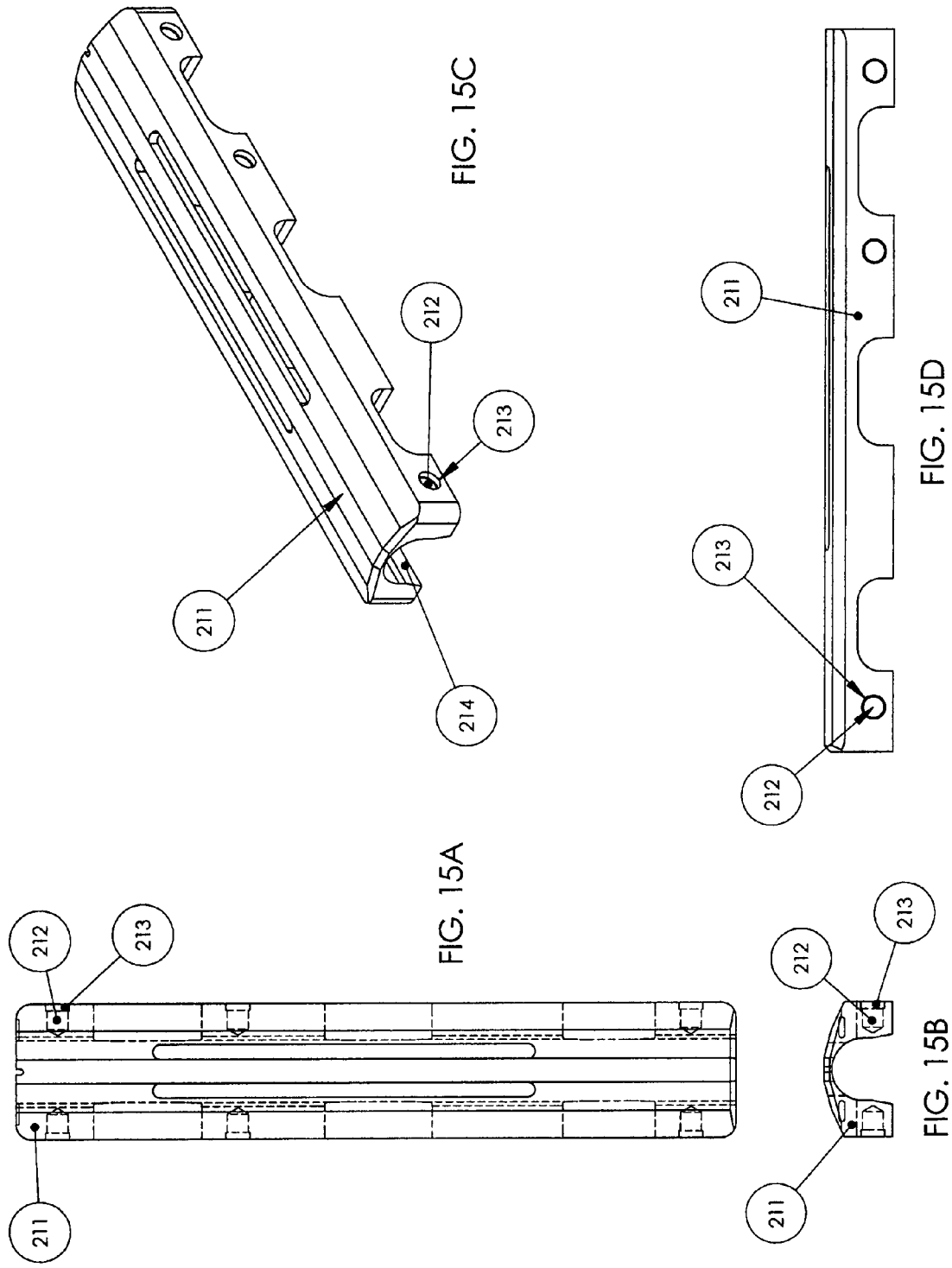

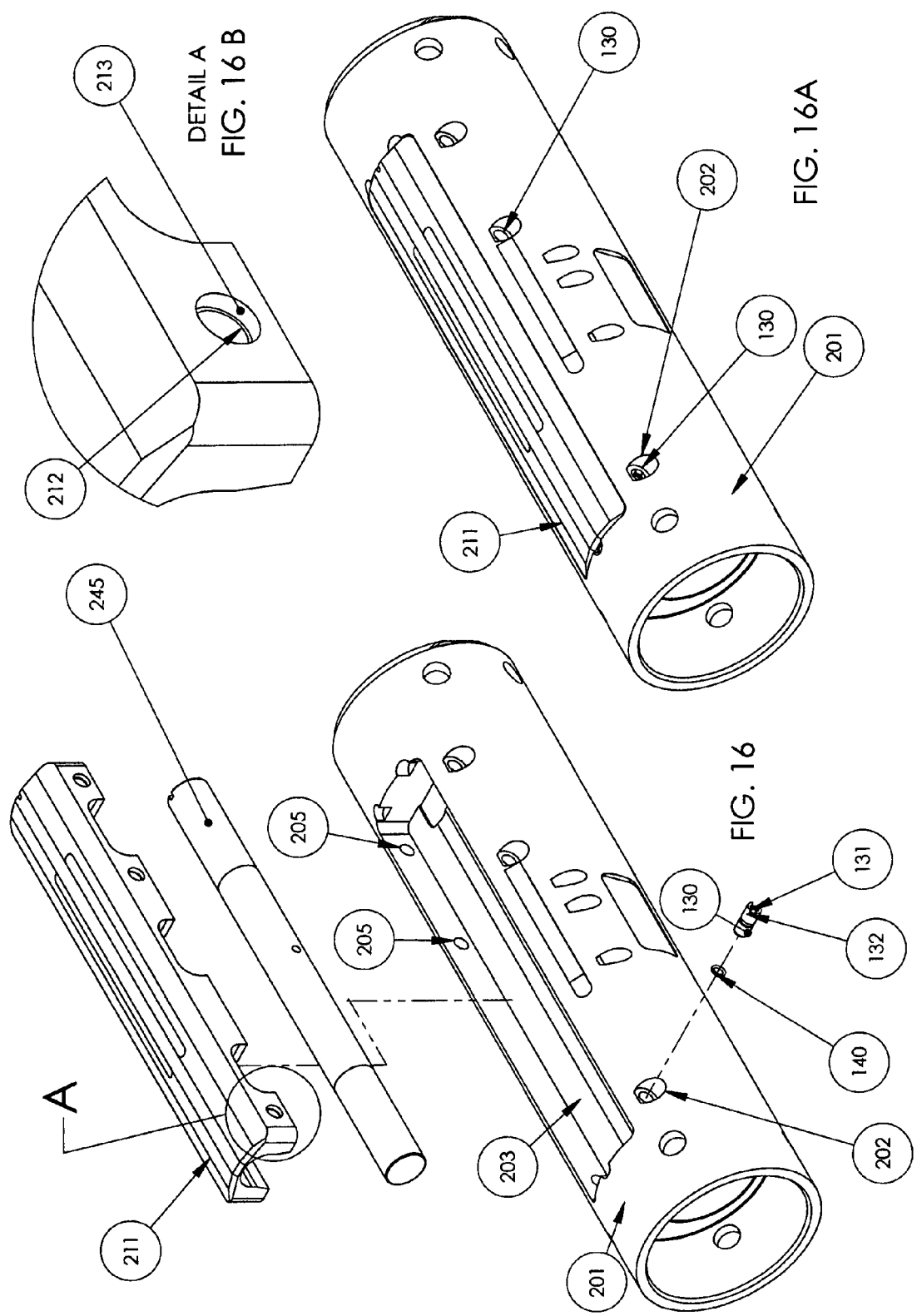

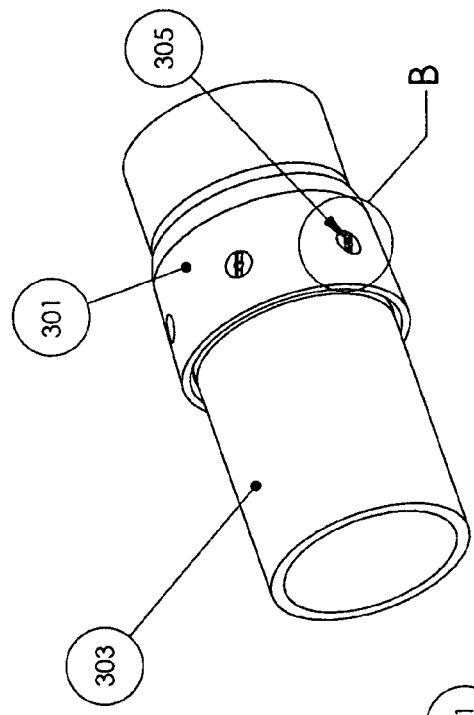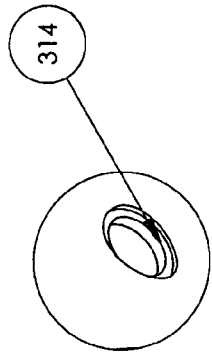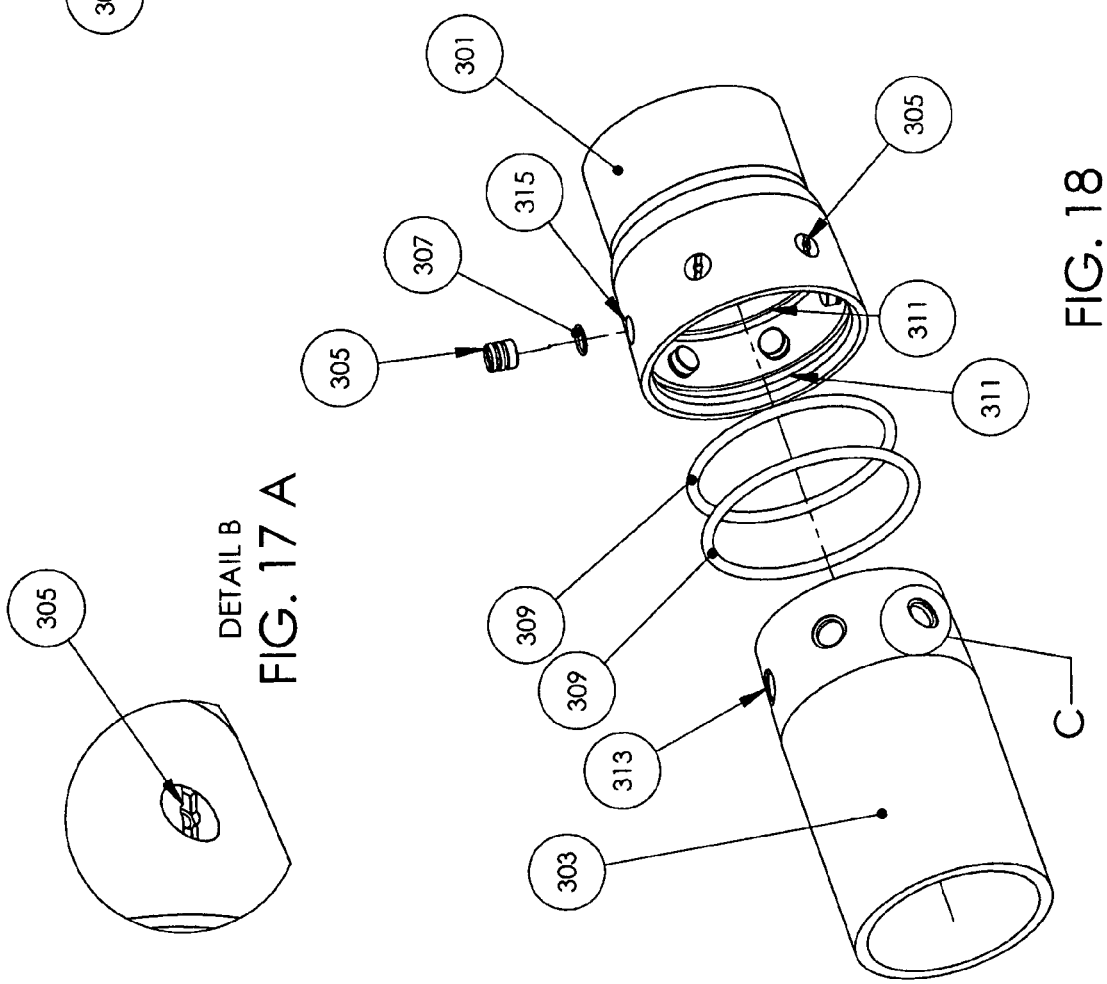

SECTION C-C

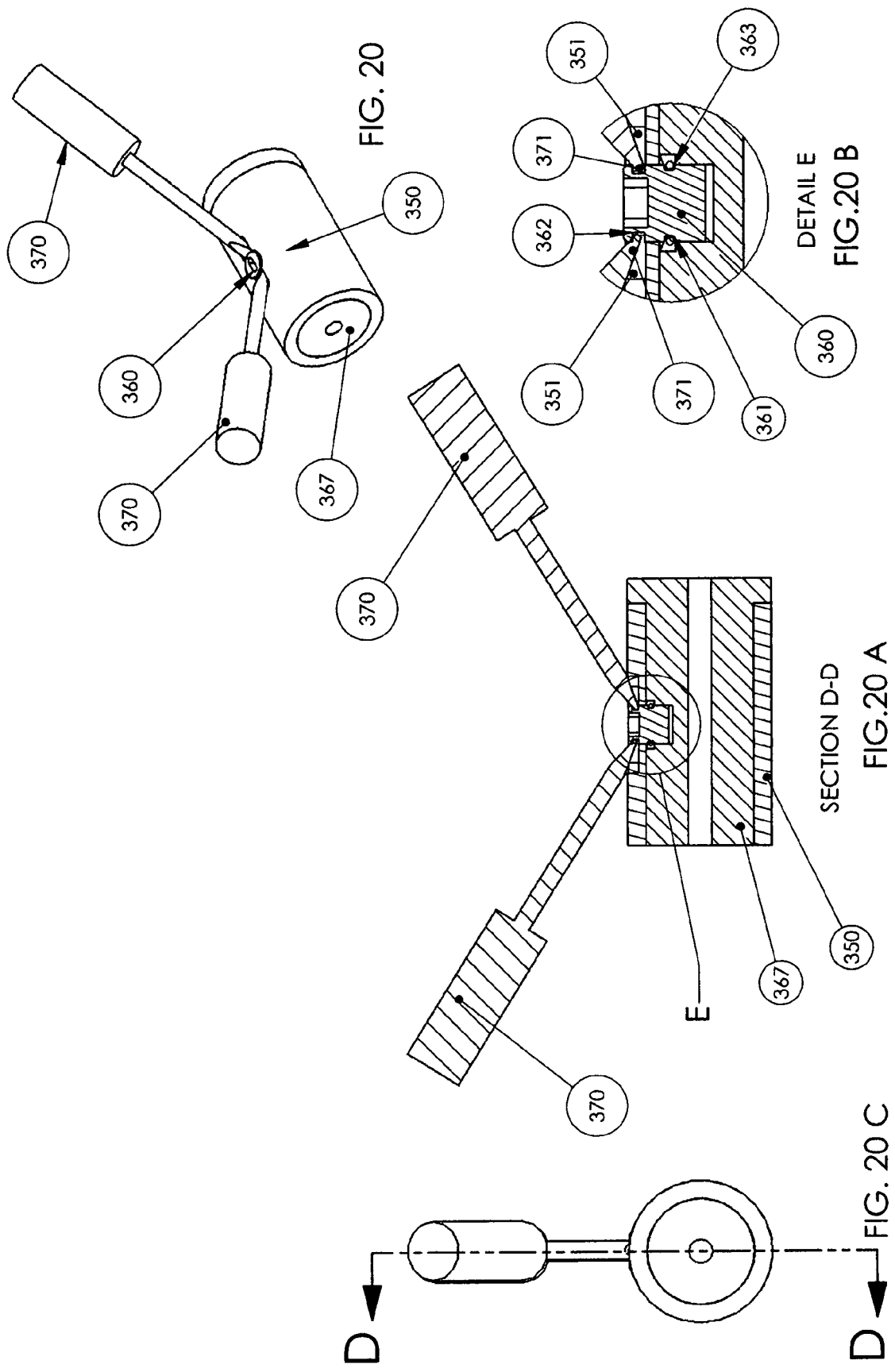

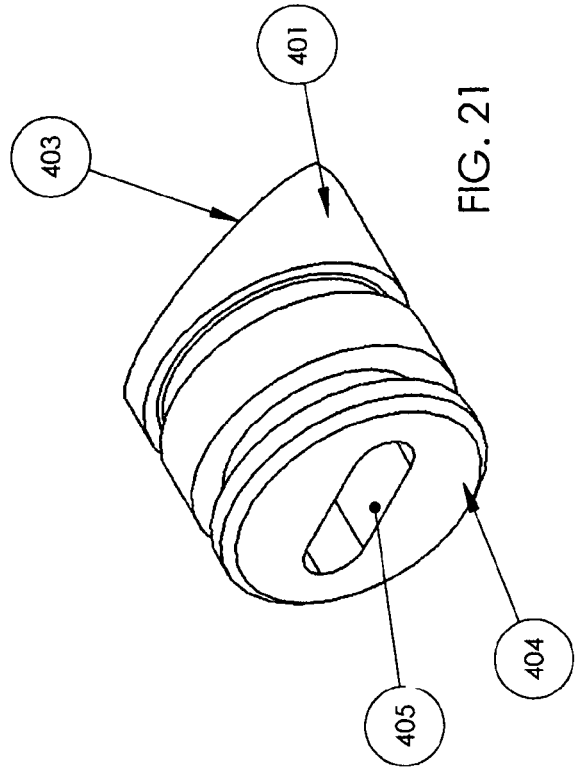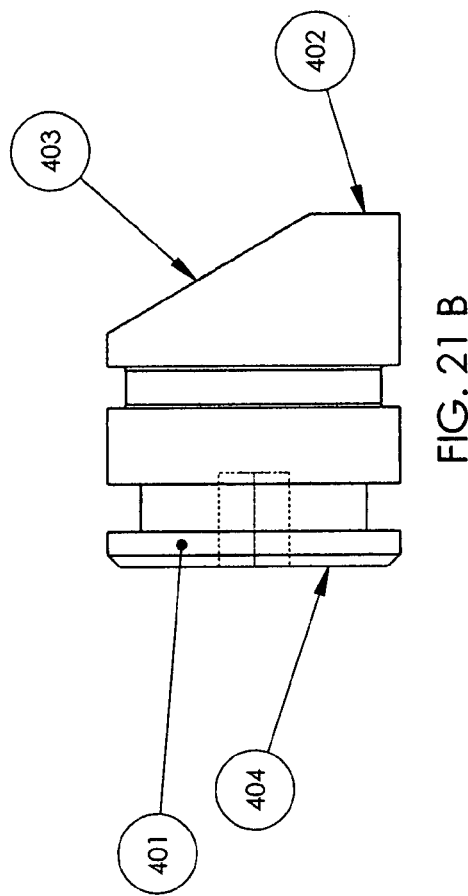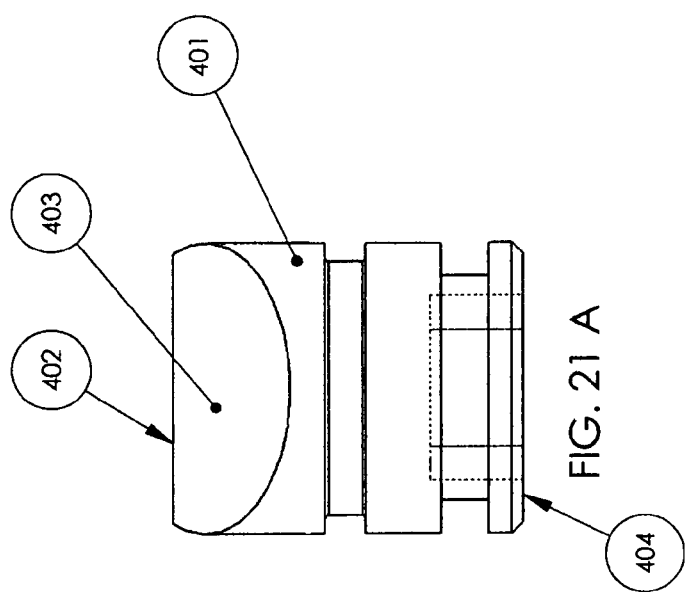

SECTION E-E

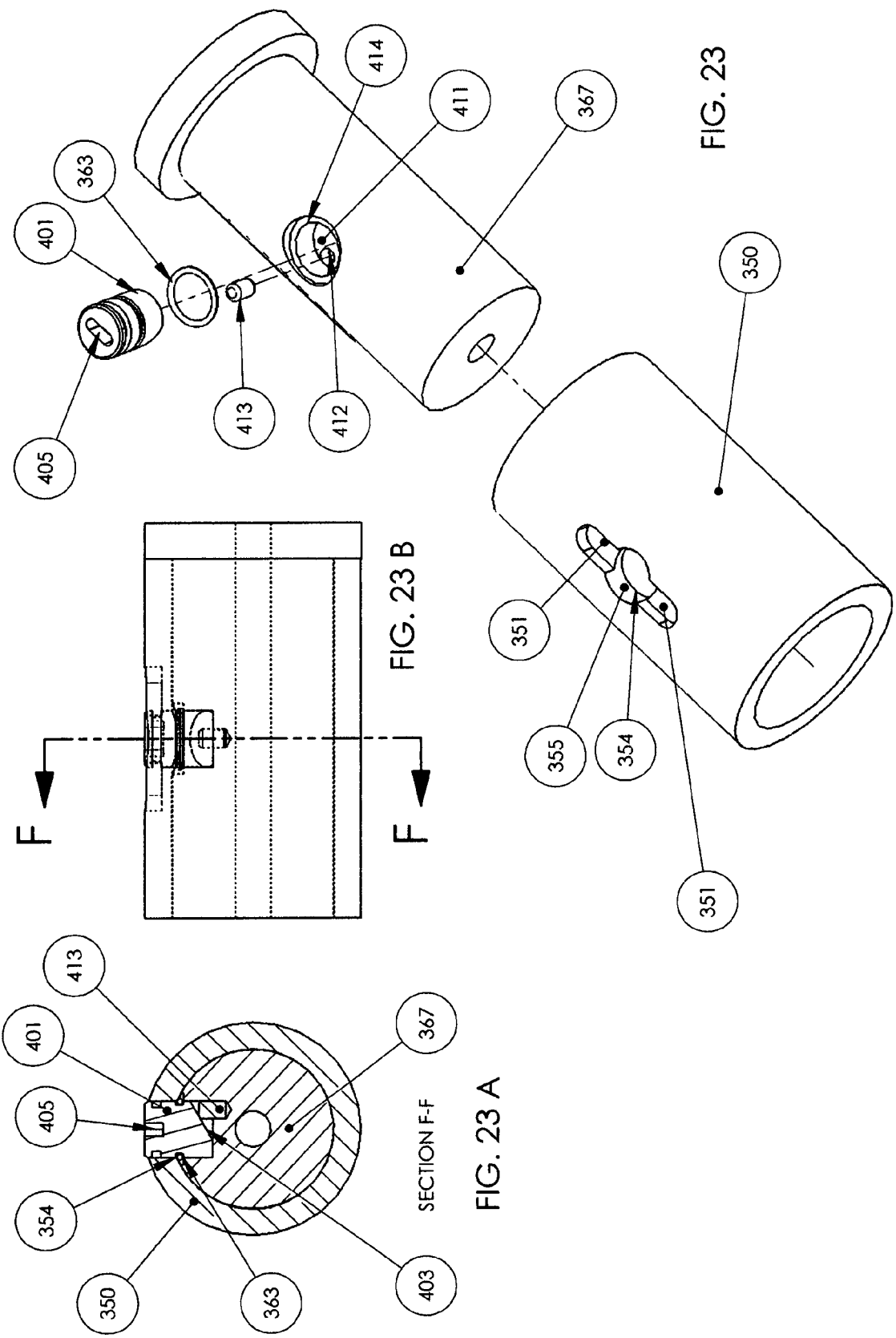

LOCKING PIN FOR COUPLING COMPONENTS

This application claims the benefit of U.S. provisional application Ser. No. 60/780,421, filed Mar. 8, 2006.

FIELD OF THE INVENTION

The present invention relates to methods and apparatuses for removably coupling together components such as drill string components.

BACKGROUND OF THE INVENTION

In the world of well drilling and directional drilling for utilities, drill bits, reamers and sonde housings are regularly attached and detached from one another or from the drill stem. In the prior art, this occurs in one of three ways.

One way is to simply use threaded connections. Threaded connections have a tendency to vibrate loose and to break. These connections have to be tightened to a predetermined torque, so that the threaded connection is as strong as possible and so that the connection does not become loosened in the almost inevitable event that the drill stem is turned in reverse. One of the many problems with this system is that in the making of threads, a stress riser is produced which causes the threads to weaken and break. Also, the tightened connection is hard to loosen which makes them slow to work with and dangerous because the operators sometimes use the drill rigs in an unsafe manner.

A second way is to use threaded connections in conjunction with a hex collar, such that after the pieces are threaded together as close as they can be, the flats on each piece are lined up and then a hex collar is slid over both pieces, then bolted into place. This system, when it works, is safer than the thread system, but it has its drawbacks. One problem is that in order to align the flats of each piece the threads cannot be tightened to their full torque. This makes the threads weaker than they would be otherwise. Also, the hex collar is held in position by a bolt that sometimes either falls out or breaks, allowing the hex collar to slide off the joint, which allows the threads to tighten as the bore is being drilled. Once this is done, the same problems as with the common threaded connection described above occur.

The third system, such as U.S. Pat. No. 6,148,935, uses round box and pin ends to intercept each other. A common o-ring system is used to make the connection water tight. An additional feature on each piece is a notch and projection system. For this system to work the notch and projection are lined up and engaged. Then roll pins or dowel pins are driven into holes that are drilled into each piece. These pins rely on friction to hold them into place. This system makes for a stronger connection than the threaded connection but it still has its drawbacks. One problem is that driving the pins in and out is difficult in some of the tight areas that the workers have to operate in. Another problem is in the manufacture of the connection, it is costly to make the notch and projection line up with the tolerances that are required to keep all of the elements lined up. A similar system to this is shown in Patent application no. 20040226750, which shows a complicated system of slots, keys and roll pins to connect drilling apparatus together.

Other industries could also benefit from my invention. It has come to my attention that artillery shells are held together by such devices as this, as shown by U.S. Pat. No. 4,348,956. U.S. Pat. No. 5,957,226 uses a pin retained by a second pin and a spring to lock together two halves of a drilling assembly. U.S. Pat. No. 4,363,505 describes a coupling assembly of two conduits. In this invention screws hold the couplings together. Other conduit couplings are held together by threaded pin devices, U.S. Pat. No. 6,918,618.

The pipe laying industry can also benefit from my invention. Conduits or pipes are connected today using various systems, ranging from compression type o-rings to gluing to various mechanical restraints.

With my invention these connections can be made stronger and cheaper than the mechanical restraining systems in use today.

SUMMARY OF THE INVENTION

The apparatus of the present invention releasably couples first and second components. The first component has a first opening located in a first wall. The first opening has a recess that opens to a surface of the first wall. The second component has a second opening located in a second wall. The second opening is aligned with the first opening. The second opening has a square edge that is adjacent to the first opening recess. The diameter of the square edge is less than the diameter of the recess. A locking pin is sized to fit within the first and second openings. The locking pin has a groove with an o-ring being located therein. The o-ring has an inside diameter that is less than the diameter of the square edge and an outside diameter that is greater than the diameter of the square edge. The locking pin is inserted into the first and second openings. The first and second components are coupled together. The o-ring is located in the recess.

In accordance with one aspect of the present invention, a seal is located on the locking pin with the seal engaging the second opening.

In accordance with another aspect of the present invention, the seal comprises a second o-ring.

In accordance with still another aspect of the present invention, an opening is provided in an outer end of the locking pin. The locking pin opening is structured and arranged to receive a pulling tool.

In accordance with still another aspect of the present invention, an exposed groove is located near an outer end of the locking pin, wherein the locking pin can be pried out of the first and second openings.

In accordance with still another aspect of the present invention, a cam pin is located in the first opening. The cam pin cooperates with a cam surface on the locking pin, wherein when the locking pin is rotated within the first opening, the cam pin and cam surface cause the locking pin to move at least partially out of the first opening.

In accordance with still another aspect of the present invention, the first and second components have co-axial longitudinal axes with the locking pin being oriented radially with respect to the longitudinal axes.

In accordance with still another aspect of the present invention, the first and second components have coaxial longitudinal axes with the locking pin being oriented tangentially with respect to the longitudinal axes.

In accordance with still another aspect of the present invention, the first and second components comprise drill pipes.

In accordance with still another aspect of the present invention, the first and second components comprise respectively a door for a sonde housing and a sonde housing.

In accordance with still another aspect of the present invention, the first and second components comprise pipe.

In accordance with still another aspect of the present invention, a chamfer is aligned with the second opening. The second opening is located between the chamfer and the recess.

The chamfer has an inside diameter that reduces from a first diameter to the diameter of the second opening. The first diameter is at least as large as the outside diameter.

In accordance with still another aspect of the present invention, the chamfer is on the second component.

In accordance with still another aspect of the present invention, the chamfer is on an insertion tool that is separate from the second component.

The present invention also provides an apparatus for releasably coupling components. The apparatus has first and second components. The first component has a first wall. The first wall has a first opening therein. The first wall has a third opening intersecting the first opening and having a square edge located at the intersection with the first opening. The second component has a second wall with a second opening being located therein. The second wall has a fourth opening. The first and second openings are aligned with each other. The third and fourth openings are also aligned with each other. A primary pin is sized to fit within the first and second openings with the primary pin having a recess that is aligned with the third opening and adjacent to the square edge. The diameter of the square edge is less than the diameter of the recess. A locking pin is sized to fit within the third and fourth openings and the recess with the locking pin having a groove with an o-ring located in the groove. The o-ring has an inside diameter that is less than the diameter of the square edge and an outside diameter that is greater than the diameter of the square edge. When the primary pin is inserted into the first and second openings and the locking pin is inserted into the third and fourth openings and the recess, with the o-ring in the recess, the first and second components are coupled together.

In accordance with one aspect of the present invention, an opening is provided in an outer end of the locking pin with the locking pin opening being structured and arranged to receive a pulling tool.

The present invention also provides a method of releasably coupling components by providing a first component with a first opening. The first opening has a recess. A second component is provided with a second opening. The second opening has a square edge. The first and second components are located together so that the first and second openings are aligned with the recess being adjacent to the square edge. An o-ring is provided on a locking pin. The o-ring has an outside diameter that is greater than the diameter of the second opening square edge and an inside diameter that is less than the diameter of the second opening square edge. A locking pin is inserted into the second opening by compressing the o-ring to fit within the second opening. The locking pin is inserted into the first opening so that the o-ring enters the recess and expands within the recess.

In accordance with one aspect of the present invention, the step of providing a first component further comprises providing a door for a sonde housing and the step of providing a second component further comprises the step of providing a sonde housing.

In accordance with still another aspect of the present invention, the step of attaching a rod to the locking pin further comprises applying a force to the rod to pull the locking pin out of the first and second openings with the o-ring being cut by the square edge.

In accordance with still another aspect of the present invention, the step of applying a force to the rod to pull the locking pin further comprises the step of moving a mass along the rod to contact a stop.

BRIEF DESCRIPTION OF THE DRAWINGS

FIGS. 1-8 show a first embodiment of the invention.
FIG. 1 is a schematic view of a first component end.

FIGS. 2A, 2B and 2C are views of a second component end that receives the first component end of FIG. 1. FIG. 2A is a side view of the second component end. FIG. 2B is a cross-sectional view of the second component end taken through lines B-B of FIG. 2A. FIG. 2C is an isometric view of the second component end.

FIGS. 3A, 3B and 3C are views of a sacrificial o-ring locking pin that secures or couples the first component end of FIG. 1 inside the second component of FIGS. 2A, 2B and 2C. FIG. 3A is a side view of the locking pin. FIG. 3B is a top or end view of the locking pin. FIG. 3C is an isometric view of the locking pin.

FIGS. 4A, 4B and 4C are views of an insertion tool used for inserting the locking pin of FIGS. 3A, 3B and 3C. FIG. 4A is a side view of the insertion tool. FIG. 4B is an end view of the insertion tool. FIG. 4C is an isometric view of the insertion tool.

FIG. 5 is an isometric view of a pulling tool for removing the locking pin.

FIG. 8A shows the locking pin still in place in the first and second component ends. FIG. 8B shows the locking pin removed from the first and second component ends.

FIGS. 9-13 show a second embodiment of the invention.

FIGS. 9A, 9B, 9C and 9D show the first component end in accordance with another embodiment. FIG. 9A shows the first component end in a side view. FIG. 9B shows the first component end in another side view, rotated 90 degrees from FIG. 9A. FIG. 9C shows an isometric view of the first component end. FIG. 9D shows an end view of the first component end, taken from the small diameter end.

FIGS. 10A, 10B, 10C and 10D show the second component end, in accordance with another embodiment. FIG. 10A shows a side view of the second component end. FIG. 10B shows another side view of the second component end, rotated 90 degrees from FIG. 10A. FIG. 10C shows an isometric view of the second component end. FIG. 10D shows an end view of the second component end.

FIGS. 11A, 11B, 11C and 11D show a primary pin in accordance with another embodiment. FIG. 11A shows an end view of the primary pin. FIG. 11B shows a side view of the primary pin. FIG. 11C shows an isometric view of the primary pin. FIG. 11D shows another end view of the primary pin, which is rotated 90 degrees from FIG. 11B.

FIGS. 12A, 12B and 12C show the locking pin of the present invention, in accordance with the other embodiment. FIG. 12A shows a side view of the locking pin. FIG. 12B shows an end view of the locking pin. FIG. 12C shows an isometric view of the locking pin.

FIG. 13 shows an exploded isometric view of the first and second component ends, primary pin and locking pin, thereby illustrating the assembly thereof. FIG. 13A shows the assembled components.

FIGS. 14-16 show a third embodiment of the invention.

FIGS. 14A, 14B and 14C show a case or housing in accordance with another embodiment of the invention. FIG. 14A shows a side view of the housing. FIG. 14B shows an isometric view of the housing. FIG. 14C shows another side view of the housing, rotated 90 degrees from FIG. 14A.

FIGS. 15A, 15B, 15C and 15D show a door for the housing. FIG. 15A shows a top view of the door. FIG. 15B shows an end view of the door. FIG. 15C shows an isometric view of the door. FIG. 15D shows a side view of the door.

FIG. 16 shows an isometric exploded view of the housing and door and locking pin. FIG. 16A shows the assembled door and housing. FIG. 16B is a detail view taken at A of FIG. 16 of the recess.

FIGS. 17-18A show a fourth embodiment of the invention.

FIG. 17 shows an assembled pipe connection, utilizing the locking pin. FIG. 17A is a detail view taken at B of FIG. 17 of the outer end of the locking pin.

FIG. 18 shows an exploded isometric view of the pipe connection of FIG. 17. FIG. 18A is a detail view taken at C of FIG. 18 of the recess.

FIGS. 19-23A show different embodiments of removing the locking pin.

FIG. 19 shows an isometric view of the second component having an opening with recesses.

FIG. 20 is an isometric view showing the coupled first and second components with pry bars removing the locking pin. FIG. 20A is a cross-sectional view taken through lines D-D of FIG. 20C. FIG. 20B is a detail view taken at E of FIG. 20A of the pry bars engaging the locking pin. FIG. 20C is an end view of the components of FIG. 20.

FIG. 21 is an isometric view of a locking pin with a cam surface. FIG. 21A is a side view of the locking pin of FIG. 21. FIG. 21B is a side view of the locking pin where the locking pin has been rotated to the side 90 degrees.

FIG. 22 is a side view of the first component showing the opening for the cam pin. FIG. 22A is a cross-sectional view taken through lines E-E of FIG. 22.

FIG. 23 is an isometric exploded view of the first and second components along with the locking pin showing the cam. FIG. 23A is a cross-sectional view taken through lines F-F of FIG. 23B of the assembled components. FIG. 23B is a side view of the assembled components.

DESCRIPTION OF THE PREFERRED EMBODIMENTS

Figure 1:
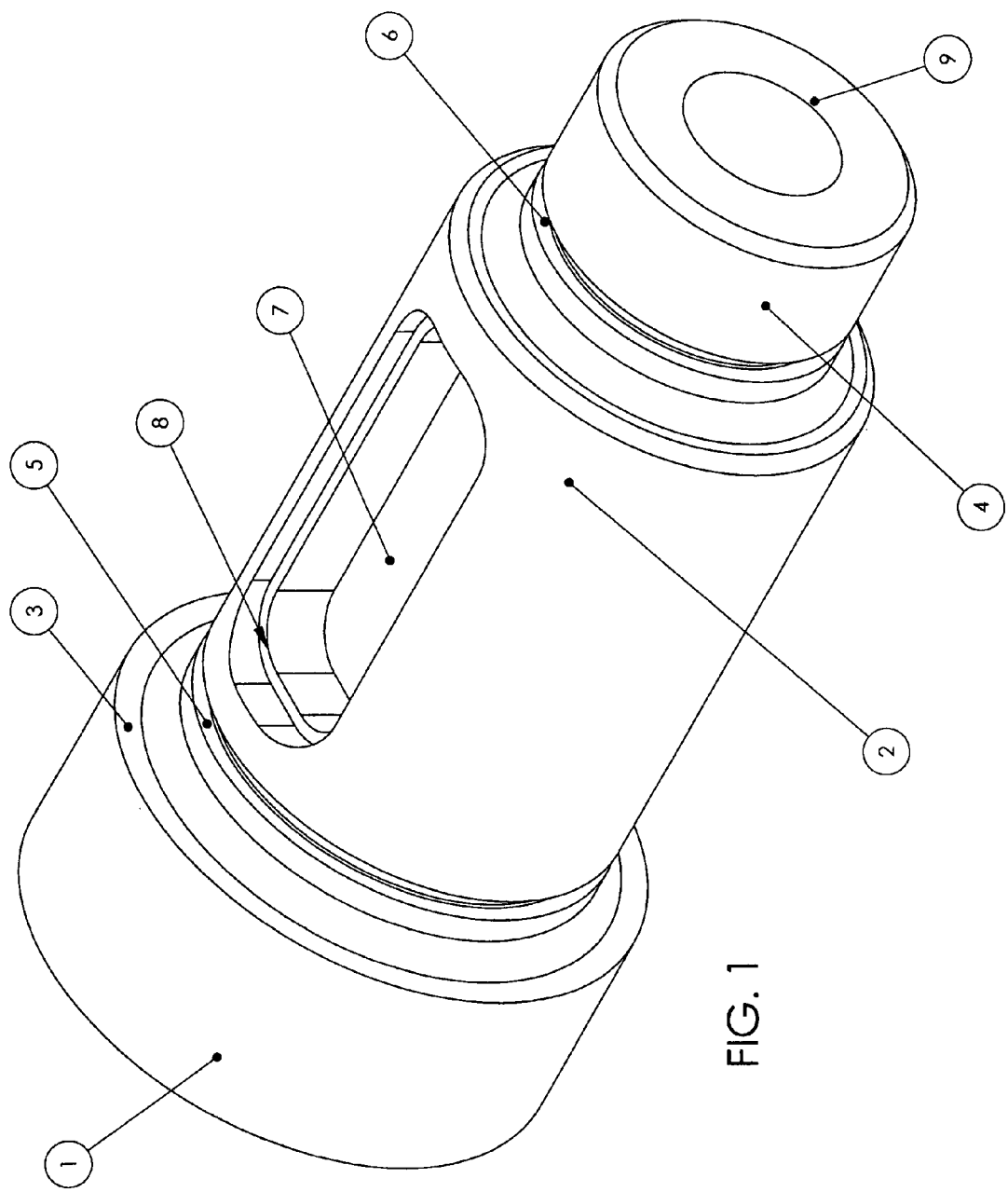

In the preferred embodiment, the present invention is used to couple various components of a drill string together. The coupling arrangement of the present invention secures components together for the various loads that are experienced by drill stem components. With the present invention, the drill stem can be rotated in a forward or reverse direction without concern of the coupling connection becoming loose or unsecure. In addition, the coupling connection withstands high torques and lateral loads. One application is shown in FIGS. 1-8, which show the coupling of a pin inside of a box. This type of coupling connection can be used to couple drill stem components together. A second embodiment is shown in FIGS. 9-13. A third embodiment is shown in FIGS. 14-16 which illustrates the coupling of a door to a sonde housing. The sonde housing is a component in the drill stem. A fourth embodiment is shown in FIGS. 17-18 which illustrates a pipe connection.

The present invention utilizes a locking pin inserted into pin holes or openings. The two components that are being coupled together each have a pin hole; the pin holes are aligned to receive the locking pin. The locking pin is secured in place by a sacrificial o-ring.

The locking pin counteracts rotational and pulling loads commonly found in drill stems and other applications.

With the locking pin of the present invention, the pin holes and the components can be made fairly simply and with a low degree of tolerance. In addition, the locking pins themselves can be made inexpensively. The locking pins can be made on automated machines. The o-rings fitted to the locking pins are commercially available components, further reducing the cost in allowing easy replacement and low cost inventory.

The locking pin is particularly useful in coupling drill string components together, such as two lengths of drill pipe, a door to a sonde housing and a blade or bit to a shoe or to the drill string. In horizontal directional drilling, such as to bury underground utilities, the drill string and bit drill a generally horizontal borehole close to the earth's surface. The drill string is subjected to high loads and forces that tend to jar connections loose. For example, in the prior art, a drill bit blade is coupled to a shoe by a number of bolts. During drilling operations, one or more of the bolts may become loose and shear off. This puts the load on the remaining bolts, leading to potential failure.

With the locking pin of the present invention, components are tightly coupled together. The locking pin will not loosen due to the jarring and loads experienced in horizontal directional drilling. As a result, fewer locking pins can be used when compared to bolts. Also, the locking pins are easy to remove to allow a change out of components.

The locking pins are stronger than the same size bolts. The locking pins can withstand a greater bending load than threaded connectors such as bolts. The locking pins cannot be over tightened and are easier and safer to disconnect than threaded connectors.

The First Component End (FIG. 1)

The first component end can be the end of a drill stem, string or pipe. The first component end 1 has a decreased diameter 2 step cut into it. A shoulder 3 is left so that it acts as a stop. A second diameter 4 maybe also cut into the end. Each step or diameter 2, 4, has an o-ring groove 5 and 6 cut into it. On the larger diameter step 2 an opening 7, or pin hole, is cut to a certain depth. The opening extends into or through the wall 2. Around this opening 7 is cut a recess or groove or counterbore 8. A longitudinal passage extends the length of the component and allows water to pass through.

The Second Component End (FIGS. 2A, 2B, 2C)

The second component end can be an end of a drill stem, string or pipe. The second component end 10 has a cavity or bore with two steps 11 and 12 cut into it. Each step has a chamfer 14 and 15 on its leading end. The cavity receives the first component end 1, with the diameter 2 located adjacent to the step 11 and the diameter 4 located adjacent to the step 12. An opening 13, or pin hole, is cut in the side or wall of the second component end 10. The diameters and shapes of the two openings 7, 13 are substantially the same. The groove 8 is larger in diameter than the opening 13. A chamfer 17 is cut around the outer edge of the opening 13. The inner edge 18 of the opening 13 is left square when viewed in cross-section (as shown in FIG. 2B). As discussed below, the inner edge 18 serves to sever an o-ring when disassembling the first and second components. A passage 16 is drilled in the center for water flow.

The Sacrificial O-Ring Locking Pin (FIGS. 3A, 3B, 3C)

The sacrificial o-ring locking pin 20 is shaped like the openings 13 and 7 in the end 10 and the end 1. Around the outer edge of the locking pin 20 is a lower o-ring groove 21 cut shallower and wider than a normal o-ring groove. This is done in order to make the o-ring harder to cut. An upper o-ring groove 22 is cut to normal dimensions and is used to form a water tight seal in the connection. A slot 23 is cut into the top of the sacrificial o-ring pin 20. Undercuts 24 are then cut in the slot 23.

The locking pin 20 has an outer end 25 exposed to the elements and an inner end 26 that is inserted into the openings 7, 13.

The Sacrificial O-Ring

The sacrificial o-ring 84 (see FIGS. 6A and 6b) can be a standard o-ring, made from normal o-ring material and of a normal cross-section. The operator can choose special o-ring material and cross-section depending on the operating parameters of the connection or coupling. In general, the only requirements of the material and cross-section are that it has to be compressible and resilient. Also a material with greater shear strength is more desirable than one with less shear strength.

The o-ring 84 has an outside diameter that is greater than the diameter of the opening 13, and an inside diameter that is less than the diameter of the opening 13. The diameter of the opening 13 and the edge 18 is the same.

Locking Pin Insertion Tool (FIGS. 4A, 4B, 4C)

The second component end 10 described above (see FIGS. 2A, 2B, 2C) has a chamfer 17 cut on the outer edge of the opening 13. This chamfer 17 may be eliminated, thus decreasing the cost of the component end 10 and increasing the strength of the connection. If the chamfer 17 is eliminated, an insertion tool 30 is needed to compress the o-rings 83, 84 of the locking pin 20 so they are not cut while entering the opening 13.

This insertion tool 30 has a tapered surface 31 leading to an opening 33 cut in the form and size of the opening 13 in the second component end 10. On the bottom side of the insertion tool a radius 32 is cut matching the diameter of the second component end 13.

Figure 5:
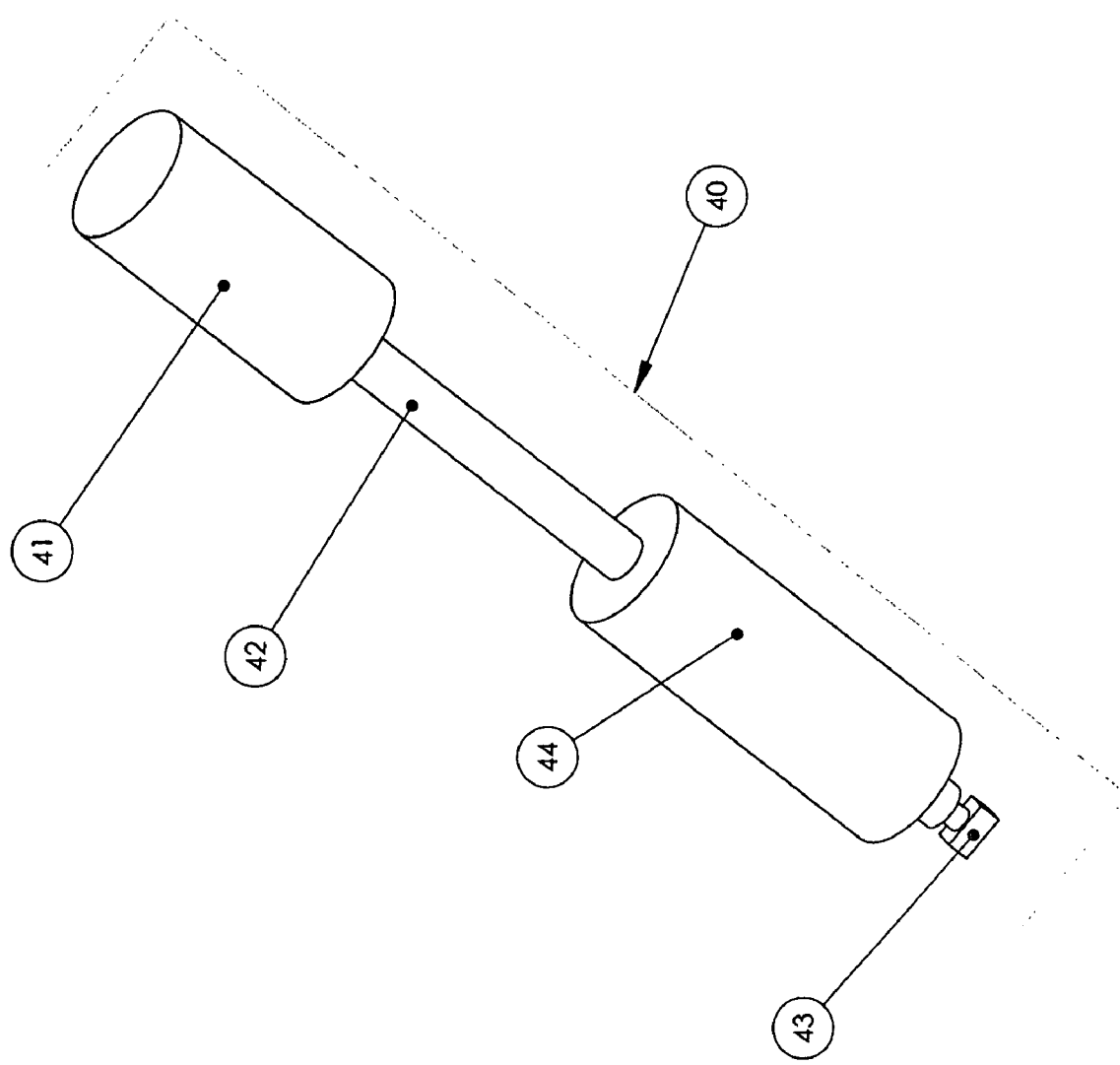

The Pulling Tool (FIG. 5)

The pulling tool 40 consists of a handle 41 with a neck 42 on it. On the other end of the neck is cross member 43. The cross member 43 is designed and sized to fit into the slot 23 and the undercuts 24 (see FIGS. 3A and 3B) of the pin 20. Mounted on the neck 42 is a sliding mass 44 that slides up and down the neck 42 for impact.

The locking pin 20 may have, as an alternative, a threaded opening 23. If so, then the pulling tool has a corresponding threaded end instead of the cross member 43.

Assembly

Figure 6A:
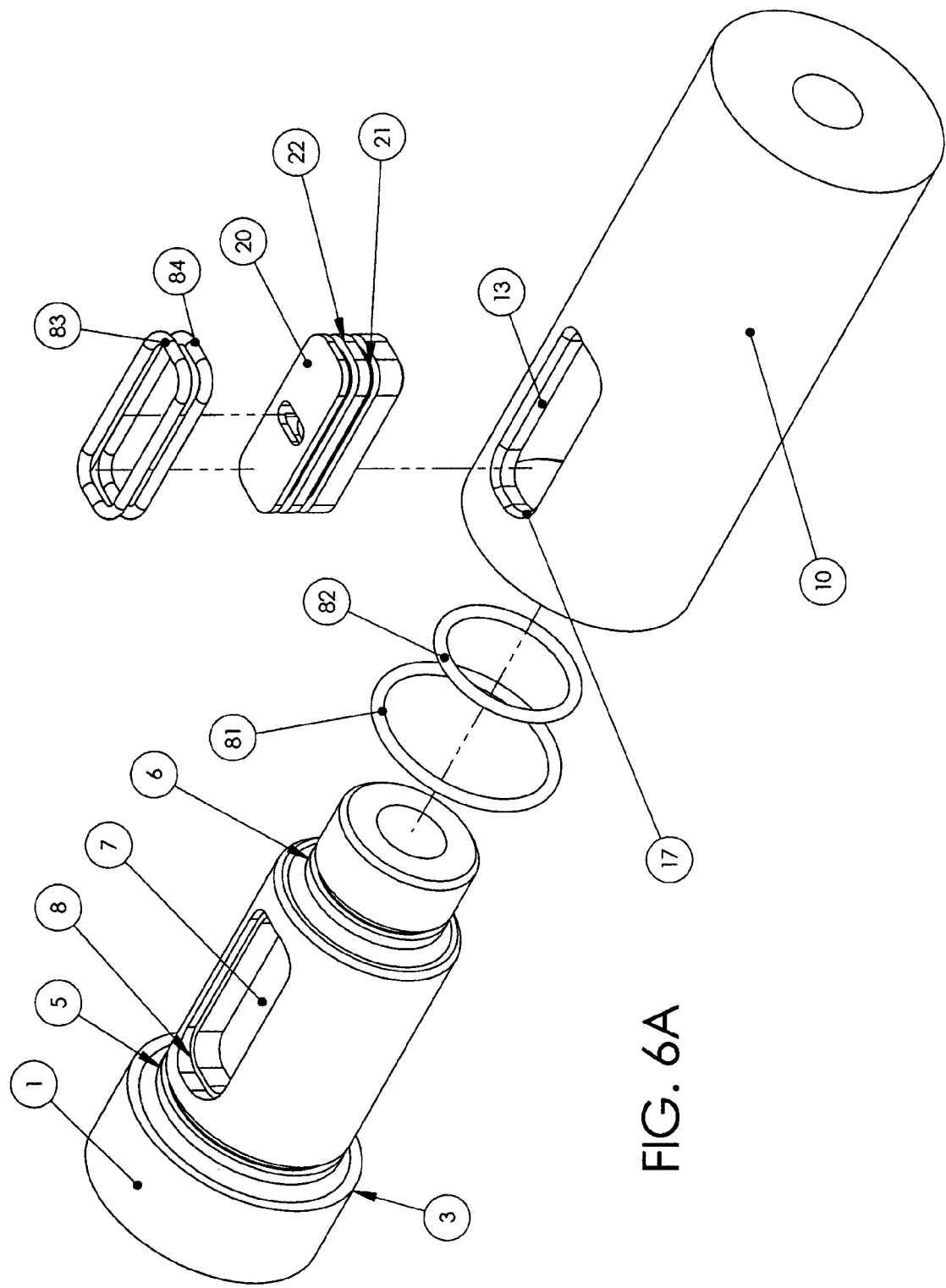
FIG. 6A is an isometric exploded view showing the assembly of the various components, including the first and second component ends and the locking pin.
Figure 6B:
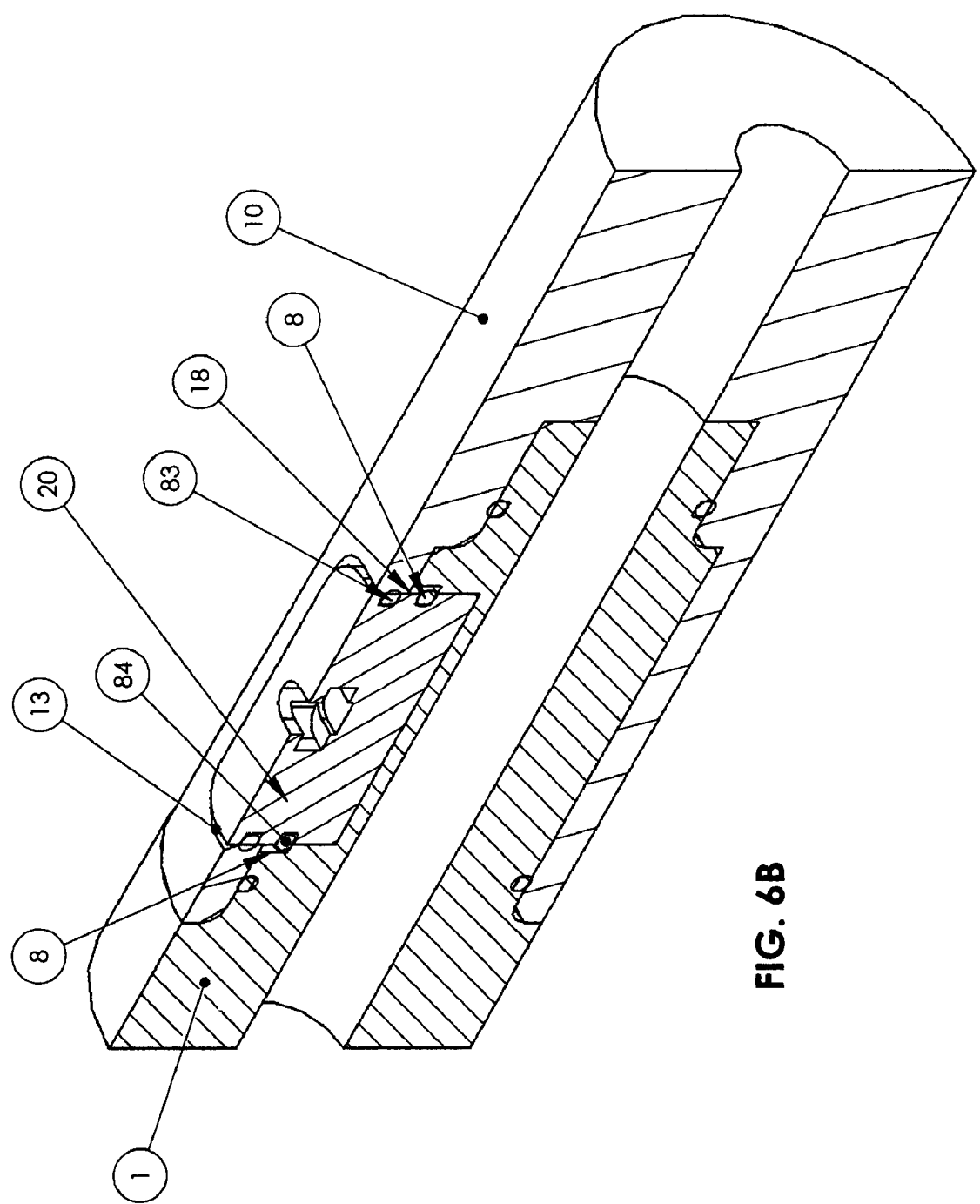
FIG. 6B is a longitudinal cross-sectional view of the first and second component ends and the locking pin shown in an assembled configuration.

1. Using the Chamfer Feature on the Second Component End. (FIGS. 6A, 6B)

To assemble the first and second component ends 1, 10, an o-ring 81 is installed in groove 5 and o-ring 82 is installed in groove 6 of the first component end 1. Then first component end 1 is inserted into second component end 10 until the two openings 7, 13 are aligned with each other.

Next o-ring 84 is installed in groove 21 of the locking pin 20 as well as o-ring 83 is installed in groove 22. Then the locking pin 20 is inserted into the opening 13. The chamfer 17 compresses the o-rings 83 and 84 as the locking pin 20 is installed. As the locking pin is pushed or inserted into the opening, the inner end of the locking pin enters the opening 7. The bottom o-ring 84 passes through the opening 13 and rests in the recess or groove 8 in the first component end 1. The upper o-ring 83 remains compressed between the locking pin 20 and the second component end 10 to form a fluid tight seal.

Once inside of the groove or recess 8, the bottom o-ring 84 decompresses and expands to a diameter larger than the diameter of the opening 13. This leaves the o-ring's 84 inside diameter smaller than the opening 13 and the o-ring's 84 outside diameter larger than the opening 13. The o-ring 84 thus prevents the removal of the locking pin 20. The locking pin 20 in turn prevents the uncoupling of the first component end 1 from the second component end 10. The inner end of the locking pin 20 may contact the bottom of the opening 7 or a shoulder. The opening bottom or shoulder acts as a stop to prevent the locking pin from being inserted so far as to damage the bottom o-ring 84 in passing through the recess 8.

2. Using the Insertion Tool (FIGS. 7A, 7B)

Figures 7A, 7B:
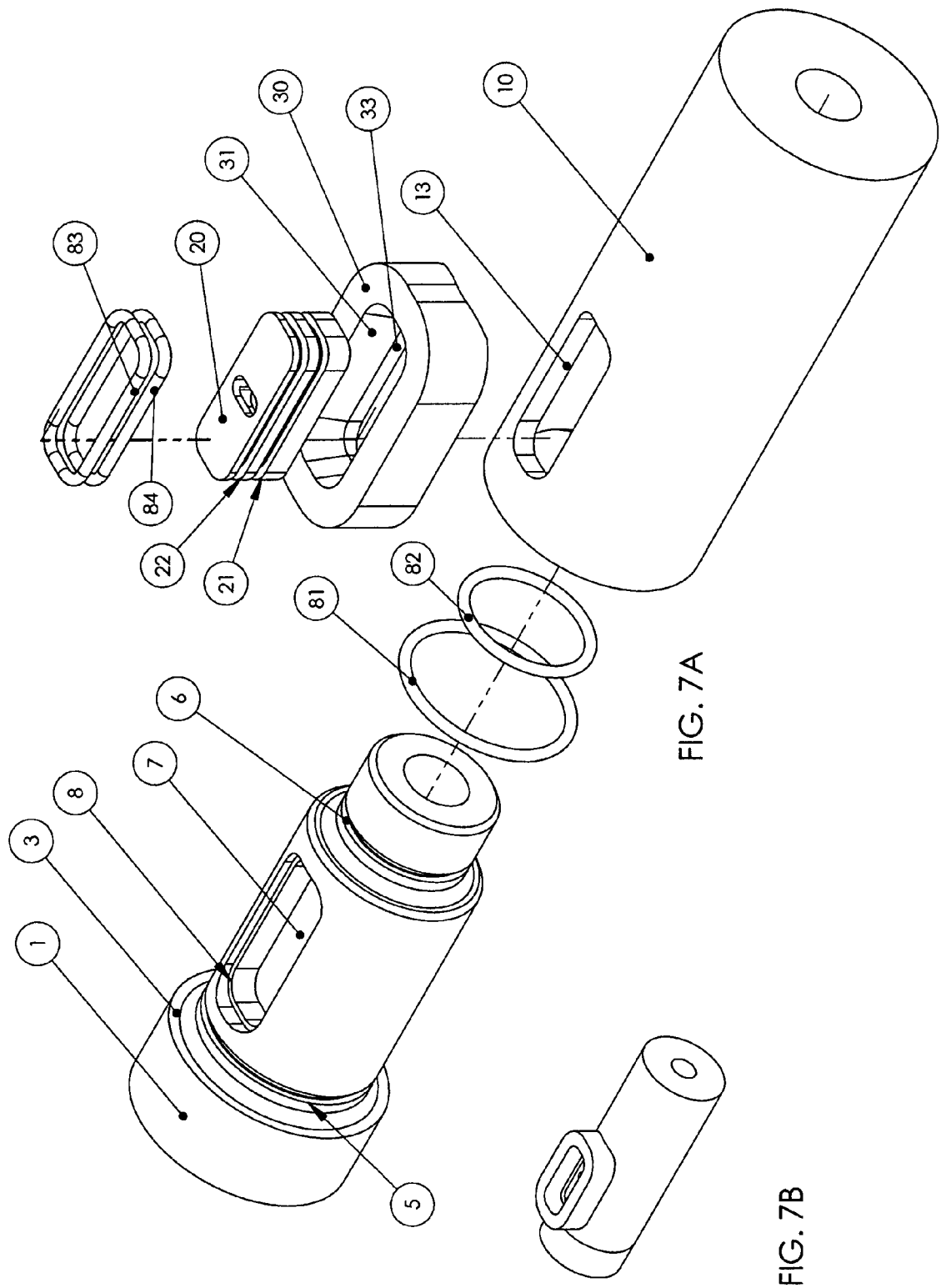
FIG. 7A is an exploded isometric view showing the assembly of the first and second component ends and the locking pin, in conjunction with another embodiment, wherein an insertion tool is utilized.
FIG. 7B is an isometric view showing the components assembled together, with the insertion tool located on the second component end.

FIGS. 7A and 7B illustrate another way to insert the pin 20. To assemble the connection, o-ring 81 is installed in groove 5. O-ring 82 is installed in groove 6. Then first component end 1 is inserted into second component end 10 until the two openings 7, 13 are aligned.

Next, o-ring 84 is installed in groove 21 of the locking pin 20 as well as o-ring 83 is installed in groove 22. Next, the insertion tool 30 is placed over the opening 13 in the second component end 10. Then the locking pin 20 is inserted into the opening 31 formed by the tapered surfaces 31 of the insertion tool 30. The insertion tool 30 compresses the o-rings 83 and 84 as the locking pin 20 is being pushed into the opening 13. In particular, the tapered surfaces 31 compress the o-rings 82, 84. The bottom o-ring 84 passes through the opening 13 and rests in the recess 8. This leaves the o-ring's 84 inside diameter smaller than the opening 13 and the o-ring's 84 outside diameter larger than the opening 13. The upper o-ring 83 remains compressed between the locking pin 20 and the second component end 10 to form a fluid tight seal. The insertion tool 30 is then removed and stored elsewhere.

By putting the chamfer for compressing the locking pin o-rings 83, 84 on the insertion tool 30 rather than on the second component end 10, the full surface of the opening 13 and wall thickness is used to abut the locking pin. This results in a stronger coupling. This type of arrangement is desirable where the wall thickness may be relatively thin.

Normal Operation

The connection between the first component end 1 and the second component end 10 is designed to stay together, with a water tight fit, until an outside force, directed perpendicular to the axis of the connection, is exerted on the locking pin 20 with enough force to shear the bottom o-ring 84. Normal thrust and rotation will not shear the o-ring 84. Under normal operation a special pulling tool 40 is needed to apply enough force to do this.

The first and second component ends 1, 10 are designed to take the bending load inherent in a bore. The ends 1, 10 use common o-rings to make the connection water tight. Shoulders or stops allow the ends 1, 10 to also accept thrust loads. The locking pin 20 counteracts the rotational and pulling loads and thrust loads.

Figure 8B:
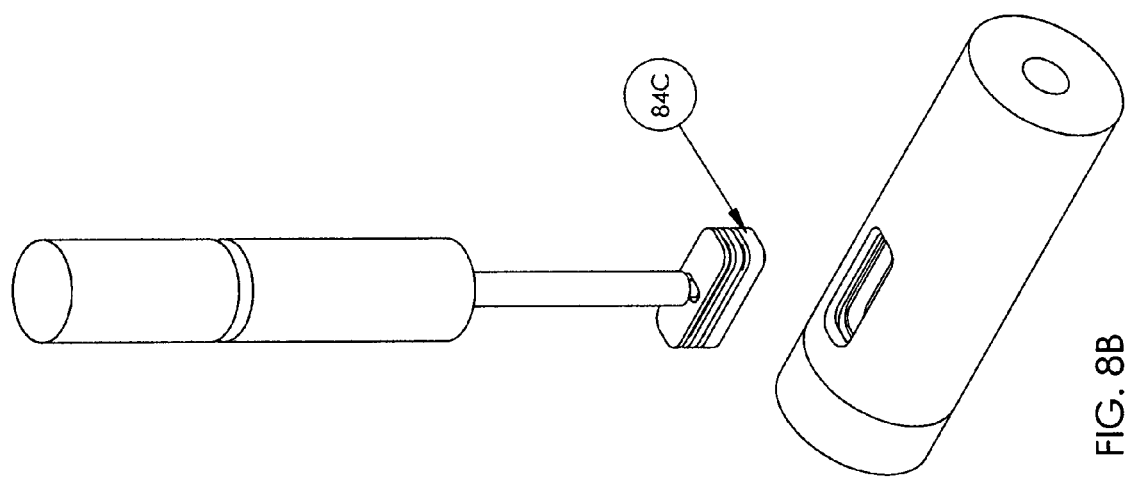
FIGS. 8A and 8B are isometric views that illustrate the removal of the locking pin using the pulling tool.
Figure 8A:
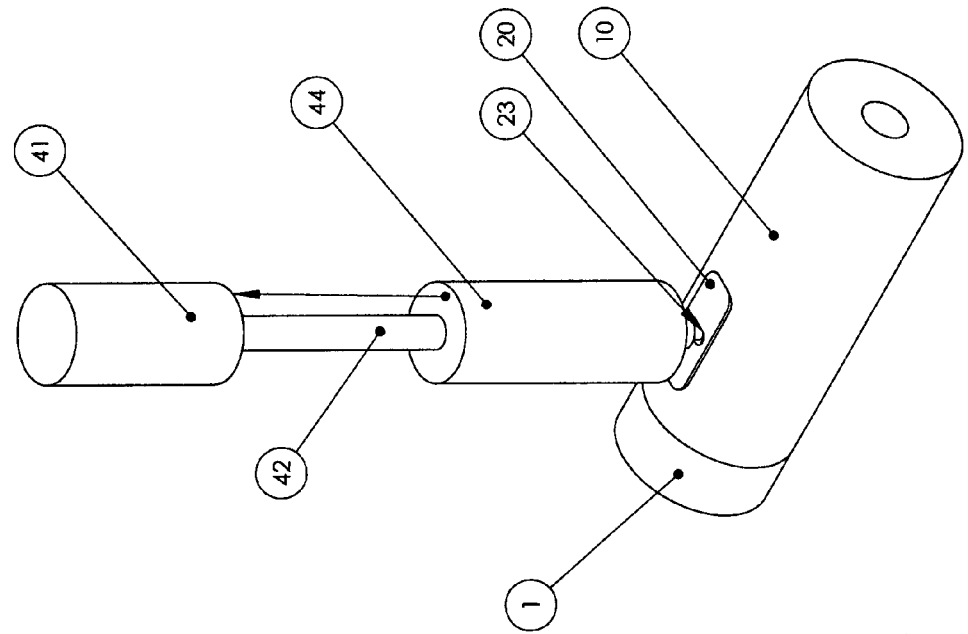

Disconnecting the Connection (FIGS. 8A, 8B)

In order to separate the first component end 1 from the second component end 10, a pulling tool 40 is needed to apply enough force to the locking pin 20 to shear the bottom o-ring 84. One way to do this is to use the pulling tool 40 described here. To use this pulling tool 40, the end 43 is inserted into the slot 23 of the locking pin 20 and then rotated approximately 90°. This allows the end 43 to lock into the undercuts 24 (see FIGS. 3A and 3B) of the locking pin 20. Then the slide mass or hammer 44 is thrust or thrown outward contacting the handle 41. The force generated by the sudden impact of the slide hammer 44 on the handle 41 is transmitted down through the neck 42 to the end 43 and then to the locking pin 20. The bottom o-ring 84 hits the inner edge 18 of the second component end 10 in such a manner as to cause it to be sheared or cut by the inner edge 18. The amount of force needed to shear o-ring 84C is determined by the properties of the o-ring material and the o-ring cross-section.

A standard puller that uses threads can be used. If a standard puller is used, the slot 23 in the locking pin 20 needs to be threaded instead of being slotted.

Once the o-ring 84C is sheared, the pin 20 can be removed and the two ends 1 and 10 can be disassembled.

The two ends 1 and 10 can be re-assembled. The cut o-ring 84C is removed from the recess 8 and from the groove 21 in the pin 20. A new, intact o-ring 84 is installed in the groove 21 of the pin 20. The two ends 1 and 10 are then ready to be reassembled.

The pulling tool 40 can be made in a variety of styles, such that it exerts an outward force on the locking pin 20.

Another Embodiment

An alternative embodiment is to use a similar male and female end system as describe above. But, instead of directly locking the joint with an sacrificial o-ring pin, a primary pin is used which is retained by the locking pin. The primary pin is subjected to the rotational and pulling forces, while the locking pin has minimal exposure to such forces.

The First Component End (FIGS. 9A, 9B, 9C, 9D)

The first component (male) end 101 is the end that has a decreased diameter 2 step cut into it. A second diameter 4 maybe also cut into the end. Each step has an o-ring groove 5 and 6 cut into it. On the larger diameter step 2 an opening 7 is cut to a certain depth. No recess or groove is required in the opening. A hole 108 is drilled perpendicular to the opening 7. Another hole 108A, located on the opposite side of the opening 7 extends all the way through the first component. The holes 108, 108A are aligned with each other with their axes being parallel. The hole 108A may be smaller in diameter than the hole 108. The inner edge 109 of the hole 108, which inner edge lies in the opening 7, is square and is not chamfered. A longitudinal passage 9 drilled thru the center allows water to flow.

The Second Component End (FIGS. 10A, 10B, 10C, 10D)

The second component (female) end 102 is the end that has a cavity or bore with two steps 11 and 12 cut into it. Each step has a chamfer 14 and 15 on its leading end. An opening 13 is cut in the side of the second component end 10. A chamfer can be provided around the edge of the opening 13. Alternatively, the insertion tool 30 can be used. The inner edge 18 of the opening 13 is left square. A hole 16 is drilled in the center for water passage. A hole 110 is drilled perpendicular to the opening 13. The hole 110 communicates with the opening 13. Another hole 110A is located on the opposite side of the opening 13 and extends through the second component. The holes 110, 110A are aligned with each other with their axes being parallel. The hole 110A may be smaller in diameter than the hole 110.

The Primary Pin (FIGS. 11A, 11B, 11C, 11D)

The primary pin 120 is shaped like the openings 13 and 7 in the two ends 101 and 102. In the side of the primary pin 120 is drilled a hole 121 with a counter relief 122. A counterbore 121A extends from the hole 121 all the way through the primary pin. A drilled and tapped hole 123 is placed in the top of the primary pin 20.

The Locking Pin (FIGS. 12A, 12B, 12C)

The locking pin 130 is cylindrical in shape to match the hole 123 in the primary pin 120. It has an o-ring groove cut 132 in it and a drill and tapped hole 131 in the outside end.

The cylindrical locking pin 130 may rotate within the openings 7, 13 as the pulling tool is threaded into the locking pin. To prevent such rotation and permit the pulling tool to be threaded into the outer end of the locking pin is provided with a slot 131A, while the corresponding end of the pulling tool mass 44 is provided with a key that fits within the slot. The mass 44 is held to prevent rotation as the neck 42 is rotated to thread into the locking pin.

Assembly (FIGS. 13, 13A)

To assemble the connection, an o-ring is installed in each of grooves 5 and 6 of the first component end 101. Then first component end 101 is inserted into second component end 102. Then the primary pin 120 is inserted into the openings 13 and 7. The primary pin 120 can be provided with a groove and an o-ring to provide a fluid tight seal. O-ring 140 is installed into o-ring groove 132 on locking pin 130. Then the locking pin 130 is installed into holes 110 and 108 which are lined up. The interior surface of 110 is tapered so that it compresses the o-ring 140 as the locking pin 130 is installed. The locking pin 130 contacts a shoulder formed at the end of the hole 121 so that the o-ring 140 rests decompressed in relief 122 of locking pin 20. The o-ring 140 has a larger diameter than the inner edge of the hole 108 thus resisting removal of the pin 130. The holes 121A, 108A and 110A are aligned with each other and with the locking pin 130.

The locking pin 130 secures the primary pin 120 in place. The primary pin 120 couples the two ends 101 and 102.

To Disassemble

A pulling tool or puller 40 is screwed into the hole 131 of locking pin 130. An outward force is applied to the locking pin 130. The o-ring 140 hits on the inner edge 109 of the hole 108, causing the o-ring 140 to be cut. This allows the removal of the locking pin 130. Then, a puller 40 is installed in the tapped hole 123 in primary pin 120 and outward force is applied to the primary pin 120 pulling it out of the openings 13 and 7. The first component end 101 can now be pulled from the second component end 102.

Alternatively, the locking pin 130 can be removed by inserting a pin into holes 110A, 108A and 121A to contact the inner end of the locking pin. The pin is then struck to push the locking pin out.

Another Use

Another use of this invention is to secure a door in a case or housing with a set of locking pins that have o-ring grooves cut into them. The door is put into a case and held in place by a set of pins pushed in from the side. These locking pins are held in place by the sacrificial o-ring system of this invention.

The Case (FIGS. 14A, 14B, 14C)

The case 201 has an opening 203 cut into it. Holes 202 are drilled perpendicular to the opening 203 so that they intersect the opening 203 above its bottom. The holes 202 have a chamfer to aid o-ring compression. An insertion tool 30 can be used instead of the chamfer around these holes. The inner edges 205 of the holes 202 are square.

The Door (FIGS. 15A, 15B, 15C, 15D)

The door 211 is shaped on its outer edge similar to the opening 203 in the case 201. A slot 214 is machined lengthwise to door 211. A set of holes 212 are drilled perpendicular to the long axis of the door 211 so that they will line up with the holes 202 in the housing 201. A relief or counter bore 213 is machined around each hole 212.

Assembly (FIGS. 16, 16A, 16B)

The transmitter 245, or sonde, is installed into the opening 203 in housing 201. The door 211 is fitted over the transmitter 245 and in the opening 203 in the housing 201. An o-ring 140 is inserted in groove 132 on each locking pin 130. A locking pin 130 with the o-ring 140 in place is installed in each hole 202 in the housing and at the same time installed into the corresponding hole 212 in the door. The chamfer on the holes 202 compresses the o-ring 140 as the locking pin 130 is being installed. The locking pin 130 bottoms out in the hole 212 in door 211. When completely installed the o-ring 140 rests decompressed in the counter bore 213 of door 211. The inner edge 205 of each hole 202 is left square, or unchamfered.

Disassembly

A pulling tool is inserted or screwed in hole 131 of locking pin 130. Outward pressure is exerted on the locking pin 130. The o-ring 140 which had been resting in counter bore 213 and groove 132 is now resisting the outward force being exerted by the pulling tool. Once the outward force is great enough, the o-ring 140 will be cut by the inner edge 205 of the hole 202. Once all of the sacrificial o-ring pins 130 are removed the door 211 can be pulled out exposing the transmitter 245.

Yet Another Use

Conduits or pipes are connected today using various systems, ranging from compression type o-rings to gluing to various mechanical restraints. By using this sacrificial o-ring system these connections can be made stronger and cheaper than the mechanical restraining systems in use today.

Pipe Connections (FIGS. 17, 17A, 18, 18A)

O-rings 309 are inserted into grooves 311 on the belled end of conduit 301. The spigot end of conduit 303 is inserted into the belled end of conduit 301. The holes 313 have a recess cut 314 around them and are aligned with the holes 315. The o-ring 307 is installed in the bottom groove of the locking pin 305. Then a locking pin 305 is installed into each of the holes 315 and into the corresponding holes 313 using an insertion tool or chamfers made directly on the conduit 301. The o-ring 307 comes to rest in the recess 314 that is cut around each hole 313 in the spigot 303 and serves to retain the locking pin 305 in place.

To disconnect the conduits 301 and 303, a pulling tool is used to pull out each of the locking pins 305 installed. The o-rings 307 are cut as the locking pins 305 are pulled out.

The Bells and Spigots

The bells and spigots can be made so that they do not cut the o-rings 309. The bells and spigots can be made in the shape of a funnel as shown in FIG. 18.

Figure 19:
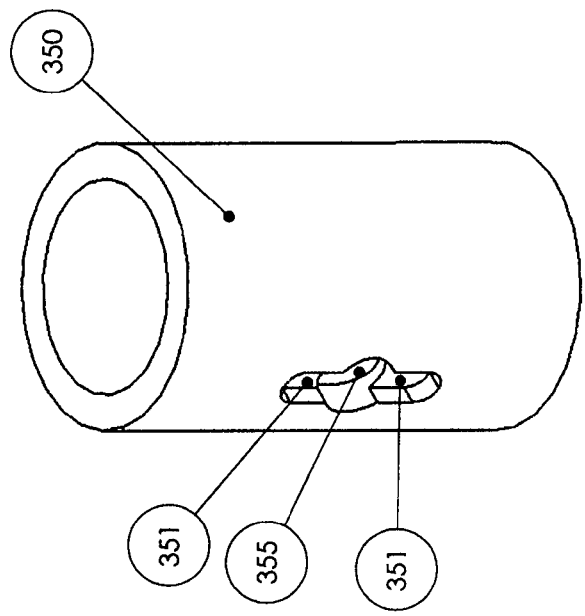
Figure 19A:
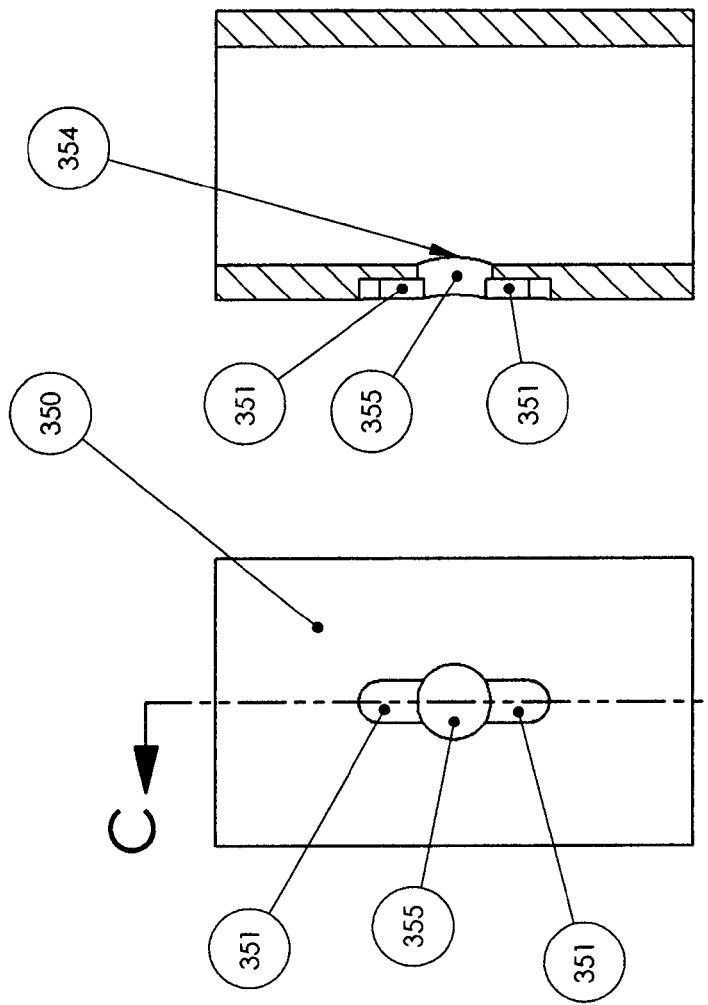
FIG. 19A shows a cross-sectional view taken through lines C-C of FIG. 19B.
Figure 19B:
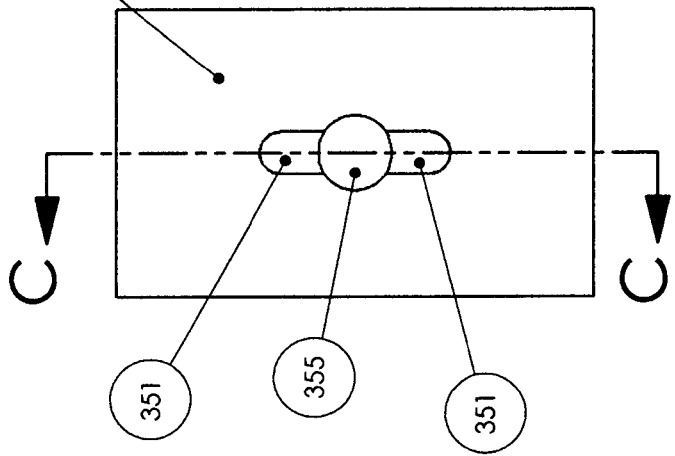
FIG. 19B shows a side view of the second component.

As discussed above, once inserted, the locking pin 20, 130, 305 can be removed using the pulling tool 40 (see FIG. 5). The locking pin can be removed using other techniques. One such technique is shown in FIGS. 19-20B, wherein the locking pin can be pried out. Another technique is shown in FIGS. 21-23A, wherein the locking pin is rotated and by way of a cam is pushed out.

The embodiment of FIGS. 19-20B will now be described. Recesses 351 are provided in the second component 350, at the edge of the opening 355. The recesses 351 are diametrically opposite of each other. Referring to FIG. 20B, the locking pin 360 has two circumferential grooves 361, 362. One groove 361, designated the "inner" groove because it is closer to the inner end of the locking pin, receives the sacrificial o-ring 363. The other groove 362, the "outer" groove, does not receive an o-ring. The recesses 351 in the second component 350 are deep enough to expose portions of the outer groove 362 and the locking pin 360.

To remove the locking pin 360 and uncouple the first and second components 367, 350, a pry bar 370 is inserted into each recess 351, with the ends 371 of the pry bars located in the outer groove 362 of the locking pin. The pry bars 370 are then pushed toward the first and second components 367, 350. The pry bars 370 pivot on the edges of the recesses 351. The leveraged force causes the o-ring 363 to shear against the edge 354 of the second component 350, wherein the locking pin is pried out and can be removed.

The embodiment of FIGS. 21-23A will now be described. As shown in FIGS. 21-21B, the inner end 402 of the locking pin 401 has a beveled portion 403 to form a cam surface. The outer end 404 of the locking pin has an opening 405. The opening 405 receives a tool that rotates the locking pin. In the preferred embodiment, the opening 405 is a slot and receives the end of a slotted screwdriver or similarly shaped tool (such as a pry bar 370). The opening 405 could be shaped to receive a square or hex drive.

Figure 22:
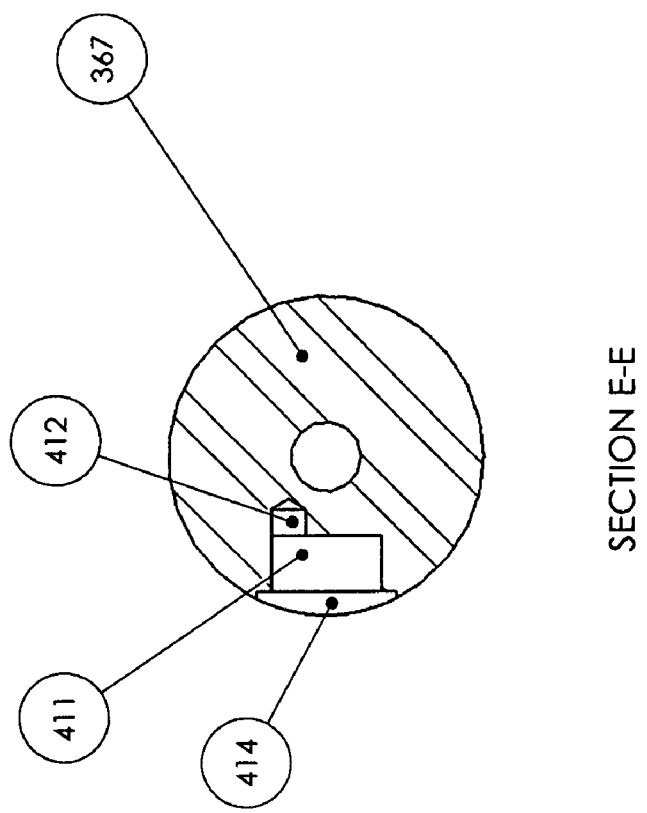
Figure 22:
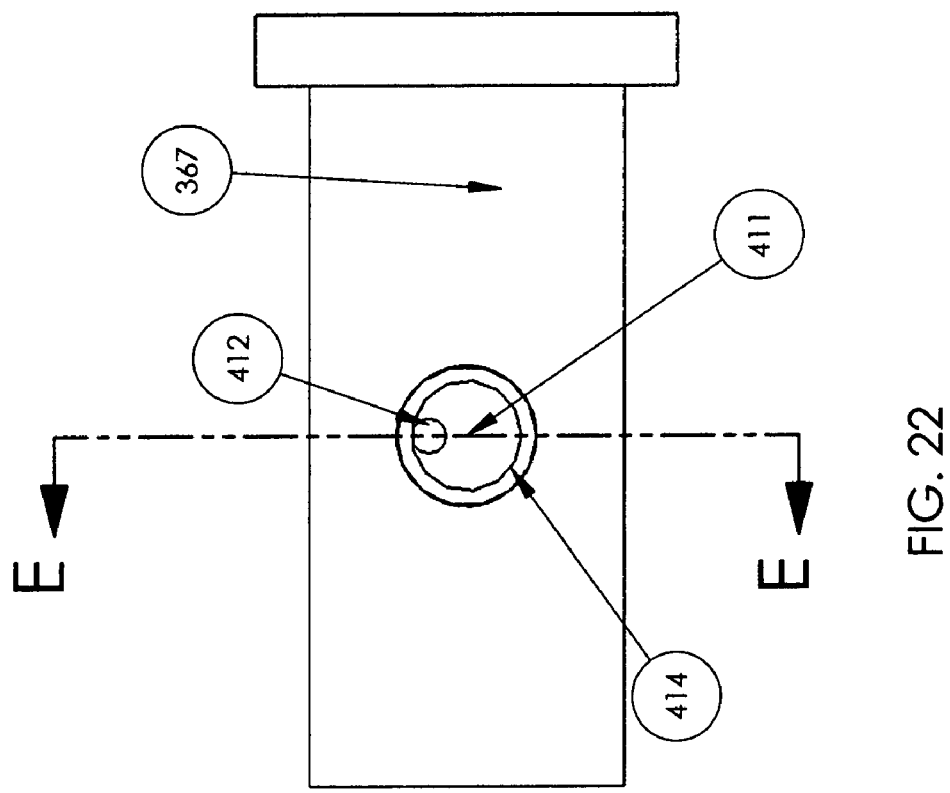

Referring to FIGS. 22 and 22A, the opening 411 in the first component 367 has a recess 414 for receiving the o-ring 363. In addition, the opening 411 has a bore 412 formed in the bottom wall of the opening. The bore is offset from the central axis of the opening 411. In the preferred embodiment, the bore 412 is offset from the central axis as much as possible. A cam pin 413 (see FIGS. 23 and 23A) is inserted into the bore 412, which cam pin protrudes from the bottom wall into the opening 411.

After the cam pin 413 is inserted into the bore 412, the first and second components 367, 350 are assembled together and secured by the locking pin 401. The locking pin 401 is oriented with the bevel or cam surface 403 positioned over the cam pin 413. The length of the cam pin 413 protruding into the opening 411 and the angle of the cam surface 403 are designed so that the sacrificial o-ring 363 is located in the o-ring recess 414.

To remove the locking pin 401 and uncouple the first and second components 367, 350, the locking pin 401 is rotated within the openings 355, 411. A tool 370 (see FIG. 20), or a slotted screwdriver, is used to rotate the locking pin 401. As the locking pin 401 rotates within the opening 411, the cam surface 403 contacts the cam pin 413 which forces the locking pin 401 to partially exit the opening 411, cutting the o-ring 363 against the edge 354. Once the o-ring is cut, the locking pin can be removed from the openings and the first and second components decoupled from each other.

The locking pin can be equipped so as to be removable by a variety of techniques. For example, the locking pin can utilize the cam rotation technique, the pry technique and the pulling tool technique.

The sacrificial o-ring locking pins can be rectangular as shown in FIG. 3C, cylindrical as shown in FIG. 12C, or any other shape. The sacrificial o-ring locking pins can have, in addition to the sacrificial o-ring that is cut or sheared upon removal, another o-ring to provide a fluid type seal.

The pulling tool can be coupled to the sacrificial o-ring pin or locking pin by a T-connection, as shown in FIG. 5, by a threaded connection such as is shown in FIGS. 11A and 12C, or by some other connection.

The sacrificial o-ring should be elastomeric so that it can be compressed in diameter to fit into the recess and then expand in diameter once in the recess. The o-ring is also capable of being severed as the locking pin is withdrawn. The sacrificial o-rings typically come in a durometer of 70. However, the sacrificial o-ring can have a durometer of 90 in order to provide more hardness and may also be made with a non-round cross-section. For example, the cross-section could be square or even clover shaped. The cross-section could be of any shape. The o-ring itself can be of any shape and need not be circular in shape, when at rest. The sacrificial o-ring can be of any material. Typically, the o-ring is made of a buna-nitrile rubber. For high temperature applications, other materials can be used, such as synthetic rubber (for example, Viton®).

This sacrificial o-ring system can be and is being used to fasten a variety of components to housings surrounding them.

The embodiments of FIGS. 6A and 6B, 7A, 14A-14C and 17-18 show the locking pin in a radial arrangement relative to the longitudinal axes of the components. The embodiment of FIGS. 13 and 13A show the locking pin in a tangential arrangement relative to the longitudinal axes of the components.

The foregoing disclosure and showings made in the drawings are merely illustrative of the principles of this invention and are not to be interpreted in a limiting sense.

The invention claimed is:

1. A method of releasably coupling components, comprising the steps of:
   a) providing a first component with a first opening, the first opening having a recess;
   b) providing a second component with a second opening;
   c) locating the first and second components together so that the first and second openings are aligned, the recess being adjacent to a square edge;
   d) providing an o-ring on a locking pin, the o-ring having an outside diameter that is greater than a diameter of the square edge and an inside diameter that is less than the diameter of the square edge;
   e) inserting the locking pin into the second opening by compressing the o-ring to fit within the second opening;
   f) inserting the locking pin into the first opening so that the o-ring enters the recess and expands within the recess.

2. The method of claim 1 wherein:
   a) the step of providing a first component further comprises the step of providing a door for a sonde housing;
   b) the step of providing a second component further comprises the step of providing a sonde housing.

3. The method of claim 1 wherein:
   a) the step of providing a first component further comprises the step of providing a first drill pipe;
   b) the step of providing a second component further comprises the step of providing a second drill pipe.

4. The method of claim 1 further comprising the steps of:
   a) attaching a rod to the locking pin;
   b) applying a force to the rod to pull the locking pin out of the first and second openings with the o-ring being cut by the square edge.

5. The method of claim 4 wherein the step of applying a force to the rod to pull the locking pin further comprises the step of moving a mass along the rod to contact a stop.

6. The method of claim 1, further comprising the step of, after inserting the locking pin into the first opening so that the o-ring enters the recess and expands within the recess, removing the locking pin by severing the o-ring against the second opening square edge.

7. The method of claim 1, wherein the first and second components have coaxial longitudinal axes, the steps of inserting the locking pin into the first and second openings further comprising the step of inserting the locking pin tangentially with respect to the longitudinal axes.

8. The method of claim 1, wherein the first and second components have coaxial longitudinal axes, the steps of inserting the locking pin into the first and second openings further comprising the step of inserting the locking pin radially with respect to the longitudinal axes.

9. The method of claim 1 wherein the step of providing a first component with a first opening further comprises the step of providing a first main component and a primary pin, further comprising the step of removably locating the primary pin in the first main component so as to create the first opening.

10. The method of claim 1 wherein the step of locating the first and second components together so that the first and second components are aligned further comprises the step of locating the square edge on the first component.

11. The method of claim 1 wherein the step of locating the first and second components together so that the first and second components are aligned further comprises the step of locating the square edge on the second component.

12. The method of claim 1 wherein the o-ring is elastomeric.

13. A method of releasably coupling components, comprising the steps of:
   a) providing a first component with a first opening;
   b) providing a second component with a second opening;
   c) locating the first and second components together so that the first and second openings are aligned, there being a recess with a square edge in one of the first or second openings, or spanning both of the first and second openings;
   d) inserting a locking pin into the first and second openings and securing the locking pin with an o-ring located adjacent to the locking pin, the o-ring at first compressed to fit with one of the first or second openings and then expanded into the recess.

* * * * *